US011866206B2

(12) United States Patent
Cracknell et al.

(10) Patent No.: US 11,866,206 B2
(45) Date of Patent: Jan. 9, 2024

(54) TECHNIQUES FOR STORING, TRANSPORTING AND OPERATING A UAV

(71) Applicant: Textron Systems Australia Pty Ltd., Notting Hill (AU)

(72) Inventors: Steven N. Cracknell, Templestowe (AU); Andrew R. Glenk, Montrose (AU); Peter A. Kernebone, Box Hill South (AU); James E. Garth, Drouin (AU); Martin E. Buggeln, Ferny Creek (AU); Emily K. Baker, McKinnon (AU); Jack Kormas, Mulgrave (AU)

(73) Assignee: Textron Systems Australia Pty Ltd., Notting Hill (AU)

( * ) Notice: Subject to any disclaimer, the term of this patent is extended or adjusted under 35 U.S.C. 154(b) by 295 days.

(21) Appl. No.: 17/289,971

(22) PCT Filed: Nov. 1, 2019

(86) PCT No.: PCT/AU2019/000138
§ 371 (c)(1),
(2) Date: Apr. 29, 2021

(87) PCT Pub. No.: WO2020/087104
PCT Pub. Date: May 7, 2020

(65) Prior Publication Data
US 2022/0001975 A1 Jan. 6, 2022

(30) Foreign Application Priority Data
Nov. 2, 2018 (AU) ................................ 2018904170

(51) Int. Cl.
*B64U 70/50* (2023.01)
*B64C 3/56* (2006.01)
(Continued)

(52) U.S. Cl.
CPC ................ *B64U 70/50* (2023.01); *B64C 3/56* (2013.01); *B64C 29/0033* (2013.01);
(Continued)

(58) Field of Classification Search
CPC ........ B64U 30/12; B64U 70/50; B64U 70/90; B64U 70/92; B64U 70/93; B64U 80/60;
(Continued)

(56) References Cited

U.S. PATENT DOCUMENTS

2017/0021941 A1 1/2017 Fisher et al.
2017/0057630 A1 3/2017 Schwaiger
(Continued)

FOREIGN PATENT DOCUMENTS

CN 206101980 4/2017
CN 106828264 6/2017
(Continued)

OTHER PUBLICATIONS

Extended EP Search Report for application No. 19879843.1, pp. 1-59, dated Jun. 3, 2022.

*Primary Examiner* — Nicholas McFall
(74) *Attorney, Agent, or Firm* — BainwoodHuang

(57) ABSTRACT

An unmanned aerial vehicle (UAV) module includes a UAV having foldable wings coupled to a body of the UAV, a UAV case having length and width dimensions that is constructed and arranged to operate in (i) a closed configuration that stores and protects the UAV while the UAV module is transported within the UAV case between locations with the foldable wings in a folded configuration, and (ii) an opened configuration that provides a base from which the UAV launches vertically from within the UAV case while the foldable wings of the UAV remain in the folded configuration. The UAV is constructed and arranged to automatically unfold the foldable wings outwards from the body of the (Continued)

UAV to form a fixed wing that extends beyond the length and width dimensions of the UAV case for fixed wing horizontal flight after the UAV is airborne.

14 Claims, 20 Drawing Sheets

(51) Int. Cl.
    *B64U 30/12* (2023.01)
    *B64U 80/60* (2023.01)
    *B64U 80/70* (2023.01)
    *B64C 29/00* (2006.01)
    *B64C 39/02* (2023.01)
    *B64U 10/13* (2023.01)
    *B64U 101/30* (2023.01)

(52) U.S. Cl.
    CPC ............ *B64C 39/024* (2013.01); *B64U 10/13* (2023.01); *B64U 30/12* (2023.01); *B64U 80/60* (2023.01); *B64U 80/70* (2023.01); *B64U 2101/30* (2023.01); *B65D 2585/687* (2013.01)

(58) Field of Classification Search
    CPC .............. B64U 80/70; B64D 2585/687; B65D 2585/687
    See application file for complete search history.

(56) References Cited

U.S. PATENT DOCUMENTS

2017/0305526 A1   10/2017   Thomassey
2017/0369150 A1*  12/2017   Finklea .................. B64U 70/20

FOREIGN PATENT DOCUMENTS

| | | |
|---|---|---|
| CN | 107361500 | 11/2017 |
| CN | 206923855 | 1/2018 |
| CN | 108698709 | 10/2018 |
| GB | 2553862 | 3/2018 |
| WO | 2016003530 | 1/2016 |
| WO | 2017037699 | 3/2017 |

* cited by examiner

Storage

Transition

Vertical Flight

Horizontal Flight

TECHNIQUES FOR STORING, TRANSPORTING AND OPERATING A UAV

CROSS REFERENCE TO RELATED APPLICATIONS

The present application is a national stage application of PCT International Application No. PCT/AU2019/000138, filed Nov. 1, 2019, and claims priority to Australian Provisional Patent Application No. 2018904170 filed on Nov. 2, 2018, all disclosures of which are hereby included by reference herein.

TECHNICAL FIELD

The improvements disclosed herein are directed to unmanned aerial vehicle (UAV) systems, and related components, articles of manufacture, and methods.

BACKGROUND

Many scenarios arise in which deployment of an unmanned aerial vehicle (UAV) is useful. Examples of such scenarios in a military context include, without limitation, performing covert reconnaissance of a remote location, confirming information regarding the enemy during active fire conditions, collecting information to assist with patrols (e.g. clearing patrols, sector patrols, etc.), and/or monitoring ground that is hidden from view (e.g. due to undulations in the land, etc.).

SUMMARY

It would be desirable to have a system that provides a user (e.g. a soldier or other type of user) with the ability to deploy a UAV in order to support operational scenarios such as those described above and others. The system should advantageously enable the UAV to be conveniently transported to a launch site and then safely launched by the user, and for the UAV to operate after launch with high performance, e.g. in terms of high endurance and high speed.

In order to address the above described and other technical objectives, an unmanned aerial vehicle (UAV) module is disclosed herein that includes a UAV having foldable wings coupled to a body of the UAV, and a UAV case having length and width dimensions. The UAV case is constructed and arranged to operate in (i) a closed configuration that stores and protects the UAV while the UAV is transported within the UAV case between locations with the foldable wings in a folded configuration, and (ii) an opened configuration that provides a base from which the UAV launches vertically from within the UAV case while the foldable wings of the UAV remain in the folded configuration. The UAV is constructed and arranged to automatically unfold the foldable wings outwards from the body of the UAV to form a fixed wing having a length that extends beyond the length and width dimensions of the UAV case for high performance fixed wing horizontal flight after the UAV is airborne.

The UAV case may include a main member and a set of doors that are moveably coupled with the main member. Each door in the set of doors may be closed relative to the main member when the UAV case is in the closed configuration, such that the main member and the set of doors define an enclosed cavity that houses the UAV while the UAV has the foldable wings in the folded configuration. The UAV case may be further constructed and arranged to automatically transition from the closed configuration to the opened configuration at least in part by automatically opening the set of doors relative the main member to allow the UAV to exit the UAV case as it launches vertically from the UAV case.

If desired, the UAV case may further be constructed and arranged to provide secure communications (e.g. secure communication channels) between the UAV case and both i) the UAV, and ii) at least one user interface terminal (UIT).

If desired, the UAV case of the disclosed UAV module may be further constructed and arranged to forward information received by the UAV case from the UAV to the at least one UIT.

If desired, the UAV case of the disclosed UAV module may further be constructed and arranged such that the UAV and the user interface terminal concurrently fit within the UAV case when the UAV case is in the closed configuration.

If desired, the UAV case of the disclosed UAV module may further be constructed and arranged to automatically transition from the closed configuration to the opened configuration and to automatically launch the UAV in response to receipt of a launch command or the like from the UIT.

If desired, the UAV case of the disclosed UAV module may be communicable with one or more external ground sensors, and the UAV case may further be constructed and arranged to automatically transition from the closed configuration to the opened configuration and to automatically launch the UAV from within the UAV case in response to receipt of a launch command or the like by the UAV case from the external ground sensor.

If desired, the UAV of the disclosed UAV module may be further constructed and arranged to, upon the UAV being launched in response to receipt by the UAV case of the launch command from the external ground sensor, automatically transmit an alert message indicating that the UAV has been automatically launched.

If desired, the UAV may further be constructed and arranged such that the foldable wings are folded under the body of the UAV when the foldable wings are in the folded configuration.

If desired, the UAV may include a set of propellers, and the UAV and the UAV case may further be constructed and arranged to provide complementary geometries in which, when the UAV case is in the opened configuration, the UAV body fits within the main member of the UAV case and the propellers of the UAV rotate freely with respect to the set of doors and the main member to allow the vertical launch of the UAV from within the UAV case.

If desired, the UAV case may further be constructed and arranged to provide a backpack-sized form factor suitable for a human to carry when the UAV case is in the closed configuration.

A method is also disclosed herein of operating a UAV module that includes (i) a UAV having foldable wings, (ii) a UAV case having length and width dimensions, and (iii) at least one user interface terminal. The method disclosed herein includes automatically opening the UAV case in response to a launch command, and then automatically starting the UAV after the UAV case is open. The disclosed method further includes vertically launching the UAV from within the UAV case with the foldable wings in a folded configuration, and, after the UAV is airborne, i) unfolding the foldable wings outwards from a body of the UAV such that the foldable wings form a fixed wing having a length that extends beyond the dimensions of the UAV case, and ii) transitioning the UAV to fixed wing horizontal flight.

If desired, the method disclosed herein may further include providing a first secure communication channel between the UAV case and the UAV, and providing a second secure communication channel between the UAV case and at least one user interface terminal (UIT).

If desired, the method disclosed herein may further include forwarding information received by the UAV case from the UAV over the first secure communication channel to the at least one UIT over the second secure communication channel.

If desired, the method disclosed herein may further include receiving the launch command, by the UAV case, from the user interface terminal.

If desired, the method disclosed herein may further include receiving the launch command, by the UAV case, from an external ground sensor that is communicable with the UAV case.

If desired, the method disclosed herein may further include, after the UAV is launched in response to receipt by the UAV case of the launch command from the external ground sensor, automatically transmitting an alert message from the UAV indicating that the UAV has been automatically launched.

Embodiments of the UAV module disclosed herein may provide significant technical advantages. For example, by enabling the UAV to be transported within the UAV case with folded wings, and then automatically launching the UAV vertically from within the UAV case while the wings remain folded, the disclosed UAV module enables a soldier or other user to conveniently transport and then safely deploy the UAV. By automatically unfolding the wings of the UAV to a length that extends beyond the dimensions of the UAV case for fixed wing horizontal flight after the UAV is airborne, the disclosed UAV module further enables the UAV to operate after launch with high performance, i.e. high endurance and high speed.

In a military context, both the convenient transporting and safe deployment of the UAV, combined with the high endurance and high speed provided by the fixed wing flight of the UAV after launch, effectively support many operational scenarios, such as covert reconnaissance of a remote location, confirming information regarding the enemy during active fire conditions, and/or collecting information to assist with patrols (e.g. clearing patrols, sector patrols, etc.).

For example, in embodiments in which the UAV case of the disclosed UAV module automatically transitions from the closed configuration to the opened configuration and automatically launches the UAV in response to a launch command received from the user interface terminal, the disclosed UAV module advantageously provides a soldier or other user with the ability to position the UAV case for safe launching of the UAV, leave the immediate area where the UAV is positioned, and then trigger the automatic opening of the UAV case and vertical launching of the UAV from a safe distance.

In another example, in embodiments in which the UAV case of the disclosed UAV module automatically transitions from the closed configuration to the opened configuration and automatically launches the UAV in response to a launch command received from an external ground sensor that is communicably coupled to the UAV case, the disclosed UAV module advantageously provides a soldier or other user with the ability to position the UAV case in an area that is hidden from view (e.g. due to undulations in the land), leave the area, and then benefit from the subsequent automatic launching of the UAV in response the ground sensor being triggered, with the UAV then automatically beginning to monitor the ground that is hidden from view.

BRIEF DESCRIPTION OF THE DRAWINGS

The foregoing and other objects, features and advantages will be apparent from the following description of the disclosed technology, as illustrated in the accompanying drawings in which like reference numbers refer to the same parts throughout the different examples and views. The drawings are not necessarily to scale, emphasis instead being placed upon illustrating the principles of various aspects of the disclosed technology.

DETAILED DESCRIPTION

Examples of the disclosed technology will now be described. The examples described herein are provided only in order to illustrate various features and principles of the invention. The invention is broader than the specific examples provided herein.

The individual components, features, and/or functions of the examples, implementations, and/or embodiments described herein can be combined in any specific combination or order that is technically feasible. Accordingly, the description herein is intended to describe the combination of the disclosed components, features, and/or functions to form all technically feasible combinations, permutations and variants except to the extent that such combinations, permutations and/or variants have been explicitly excluded or are technically impractical. Support for such combinations, permutations and variants is therefore provided within this disclosure.

Figure 1:
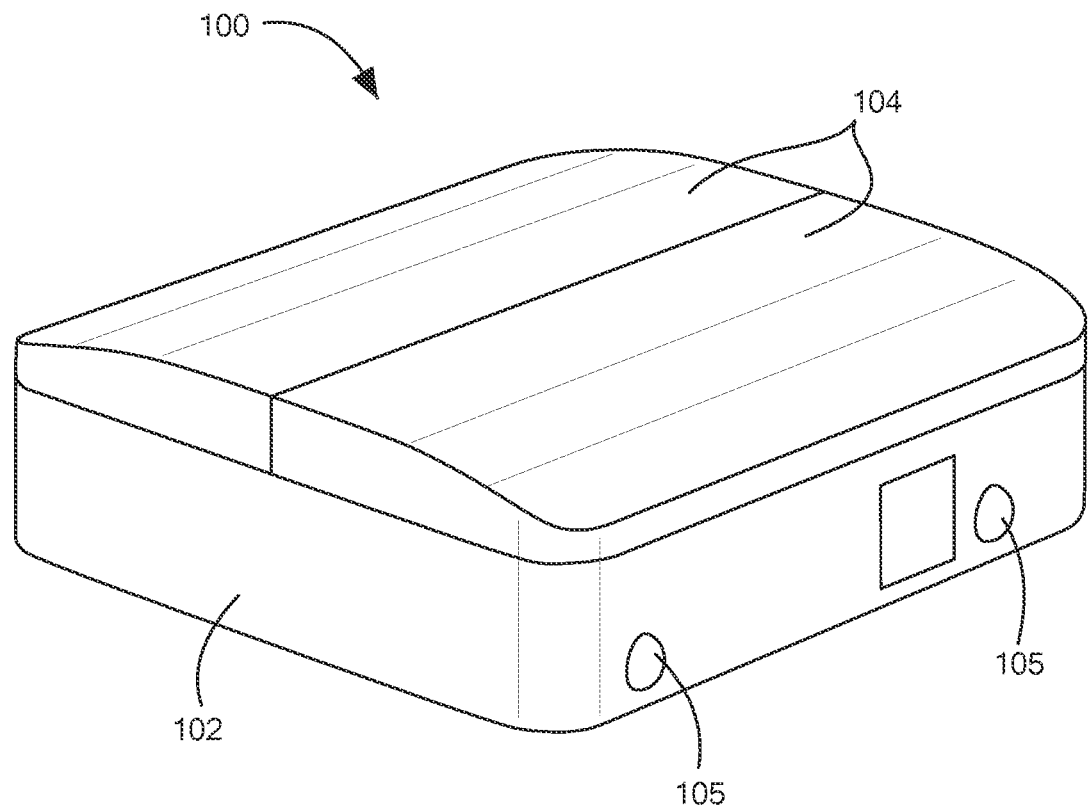
FIG. 1 shows an example of the UAV (Unmanned Aerial Vehicle) case disclosed herein in a closed configuration.

The UAV (Unmanned Aerial Vehicle) module disclosed herein includes a UAV case and a UAV. The UAV Case 100 of FIG. 1 is an example of the disclosed UAV case in a closed configuration. As shown in FIG. 1, the UAV Case 100 includes a Main Member 102 and a Set of Doors 104 that are moveably coupled to the Main Member 102. As shown in FIG. 1, when the UAV Case 100 is in the closed configuration, each door in the Set of Doors 104 is closed relative to the Main Member 102. When each door in the Set of Doors 104 is closed relative to the Main Member 102, the Main Member 102 and Set of Doors 104 define an enclosed cavity having a size that is sufficient to house the disclosed UAV when the UAV has its foldable winds folded in a folded configuration. See for example Cavity 500 shown in FIG. 5. Accordingly, when the UAV Case 100 is in the closed configuration shown in FIG. 1, the UAV Case 100 stores and protects the UAV while the UAV is contained within the UAV case, and the UAV can be safely and conveniently transported between locations within the UAV case while the foldable wings of the UAV are in the folded configuration. As further described herein, the foldable wings of the disclosed UAV are folded when the UAV in a storage configuration.

The UAV Case 100 includes Communication and Power Interfaces 105 that enable the UAV Case 100 to be physically connected to one or more external devices and/or communication networks (e.g. to a high gain antenna, a wired UIT (User Interface Terminal), and/or one or more communication networks), and/or to one or more external power sources (e.g. one or more batteries, etc.).

Figure 2:
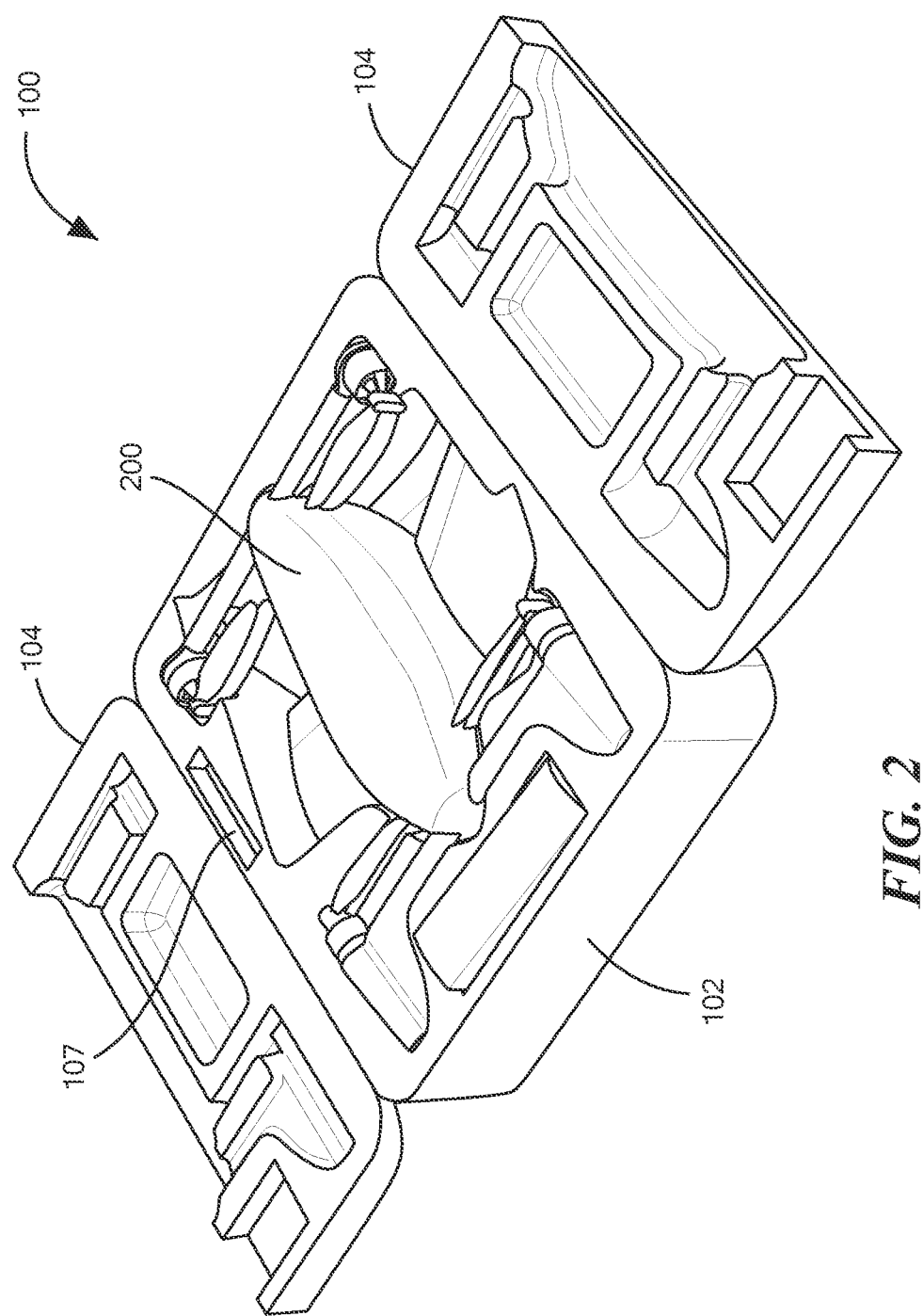
FIG. 2 shows an example of the UAV case disclosed herein in an opened configuration, and an example of the UAV disclosed herein carried inside the UAV case.

FIG. 2 shows an example of the UAV Case 100 in an opened configuration, and an example of the UAV of the disclosed UAV module, e.g. UAV 200. In the example of FIG. 2, the UAV 200 is shown in the storage configuration, suitable for being carried within the UAV Case 100 when the UAV Case 100 is in the closed configuration.

In the example of FIG. 2, the UAV 200 is shown within the UAV Case 100 after the UAV Case 100 has automatically transitioned from the closed configuration to the opened configuration. As shown in FIG. 2, in the opened configuration, the Set of Doors 104 of UAV Case 100 have been opened to allow the UAV 200 to launch vertically from within the UAV Case 100. For example, as shown in FIG. 2, the Set of Doors 104 may include or consist of two oppositely opening doors that automatically open when the UAV Case 100 automatically transitions from the closed configuration of FIG. 1 to the opened configuration of FIG. 2 (e.g. two doors that automatically open outwards from the Main Member 102 in response to receipt of a launch command by the UAV Case 100), in order to allow the UAV 200 to exit upwards from the UAV Case 100 when the UAV 200 launches vertically from within UAV Case 100.

As also shown in FIG. 2, the UAV Case 100 may be constructed and arranged such that in addition to the UAV 200, one or more UITs (User Interface Terminals) may concurrently fit within UAV Case 100 when UAV Case 100 is in the closed configuration. For example, as shown in FIG. 2, a UIT Storage Slot 107 may be provided within the Main Member 102, and used to store and transport one or more UITs, e.g. when the UAV Case 100 is in the closed configuration.

Figure 3:
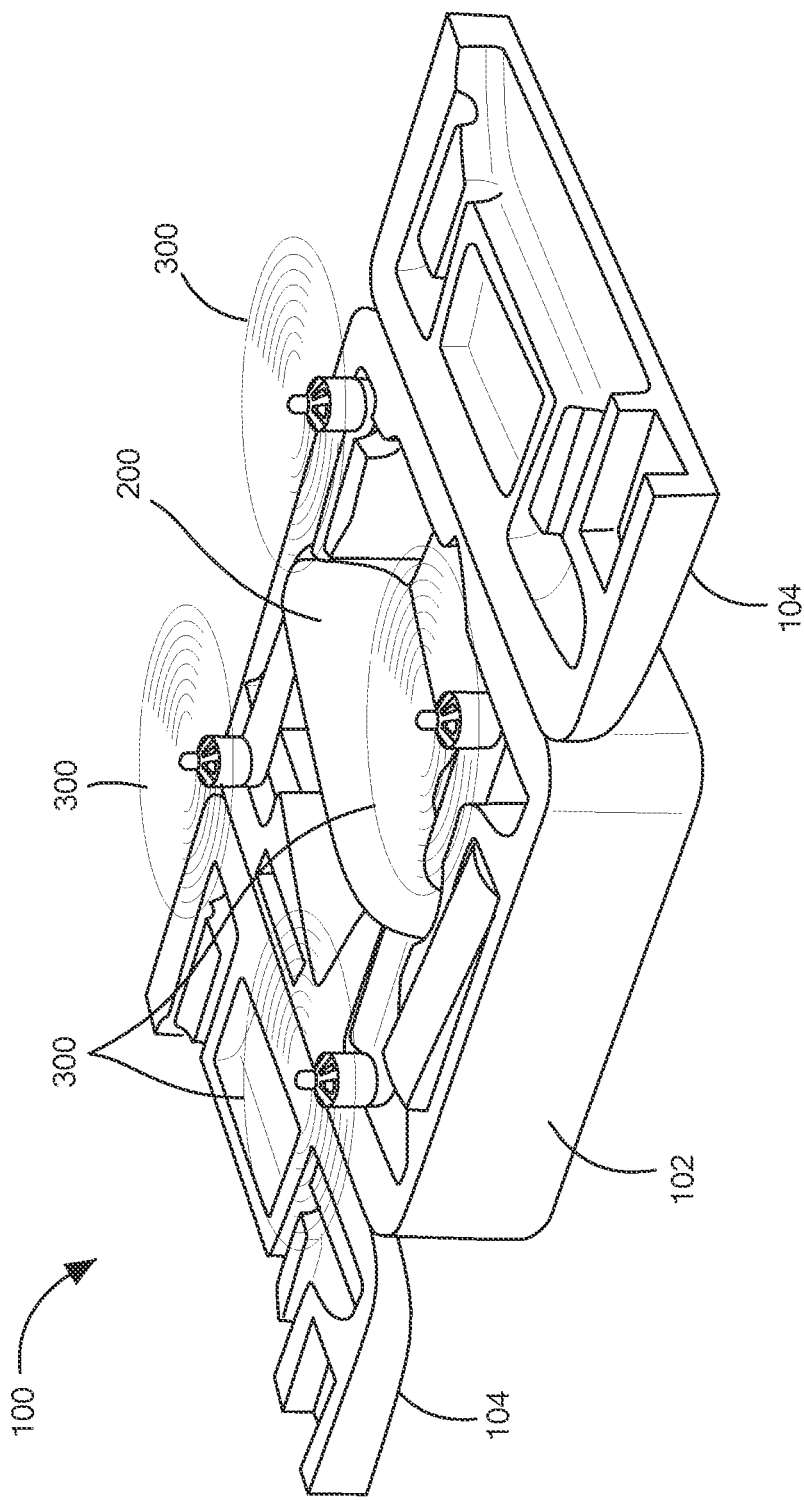
FIG. 3 shows an example of the UAV vertically launching from within UAV case.

FIG. 3 shows an example of the UAV 200 in preparation for vertical launch from within UAV Case 100. As shown in FIG. 3, the UAV 200 has previously transitioned from the storage configuration to a vertical flight configuration, in which the Set of Propellers 300 have rotate horizontally above the Main Member 102 of the UAV Case 100. For example, further in response to receipt of the launch command by the UAV Case 100, the UAV Case 100 may issue one or more commands to the UAV 200 (e.g. via an encrypted wireless communication channel between the UAV Case 100 and the UAV 200) that cause the UAV 200 to automatically transition, while it is located within the UAV Case 100 and while the UAV Case 100 is in the opened configuration, from the storage configuration in which the motor for each propeller in the Set of Propellers 300 is turned off and oriented horizontally, to the vertical flight configuration in which the motor for each propeller in the Set of Propellers 300 is oriented vertically and turned on, such that each propeller in the Set of Propellers 300 rotates horizontally and freely with respect to the Set of Doors 104 and the Main Member 102, e.g. above the Main Member 102 after the Set of Doors 104 has been automatically opened. Transition of the UAV 200 from the storage configuration to the vertical configuration while the UAV 200 is within the UAV Case 100 and the UAV Case 100 is in the open configuration automatically causes the UAV 200 to be launched vertically from within the UAV Case 100.

FIG. 3 also illustrates how the UAV 200 and the UAV Case may be constructed and arranged to provide complementary geometries in which, when the UAV Case 100 is in the opened configuration, the body of the UAV 200 fits within the Main Member 102 of the UAV Case 100 while the Set of Propellers 300 rotates horizontally and freely with respect to the Set of Doors 104 and the Main Member 102.

Figure 4:
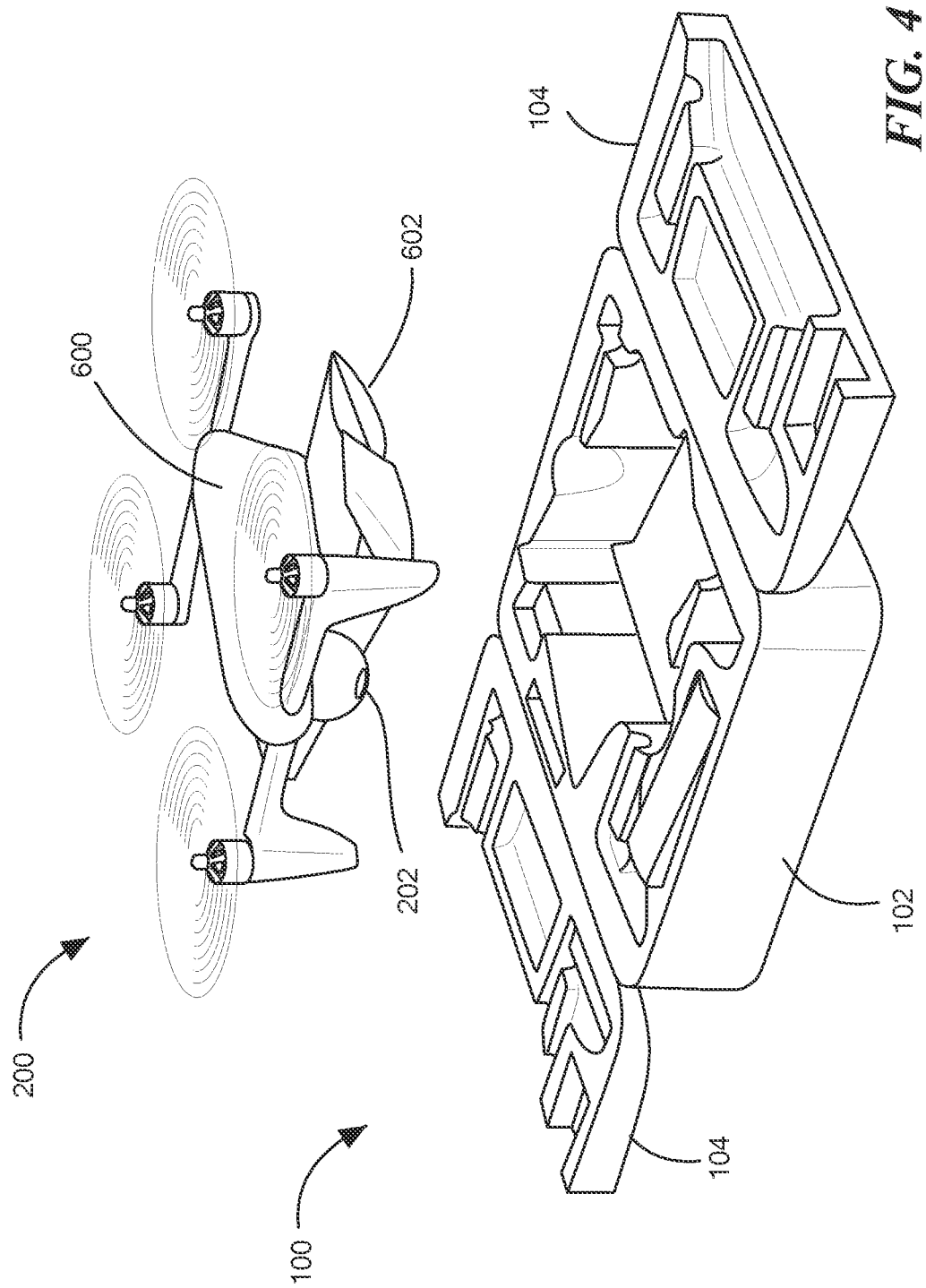
FIG. 4 shows an example of the UAV initially airborne after being vertically launched from within UAV case.

FIG. 4 shows an example of the UAV 200, after the UAV 200 has vertically launched from within the UAV Case 100, with the UAV 200 airborne above the UAV Case 100. For example, in response to the one or more commands issued by the UAV Case 100 to the UAV 200 (e.g. via the encrypted wireless communication channel between the UAV Case 100 and the UAV 200) that caused the UAV 200 to automatically transition from the storage configuration to the vertical flight configuration while the UAV 200 is within the UAV Case 100, the UAV 200 may vertically launch automatically from within the UAV Case 100 after it transitions to the vertical flight configuration, resulting in the UAV 200 being launched from within the UAV Case 100 and becoming airborne above the UAV Case 100 while in the vertical flight configuration.

FIG. 4 also shows an example of a payload that may be carried by the UAV 200, e.g. the Gimbal Camera 202. Other payloads and/or functionality may also or alternatively be carried by or integrated into the UAV 200, such as, for example, communication relay equipment, built in acoustic gunfire detection circuitry, and/or various types of sensors.

FIG. 4 also shows the Body 600 and Foldable Wings 602 of the UAV 200, and shows that while UAV 200 is in the vertical flight configuration, the Foldable Wings 602 remain folded under the UAV Body 600, as they were when the UAV 200 was in the storage configuration.

Figure 5:
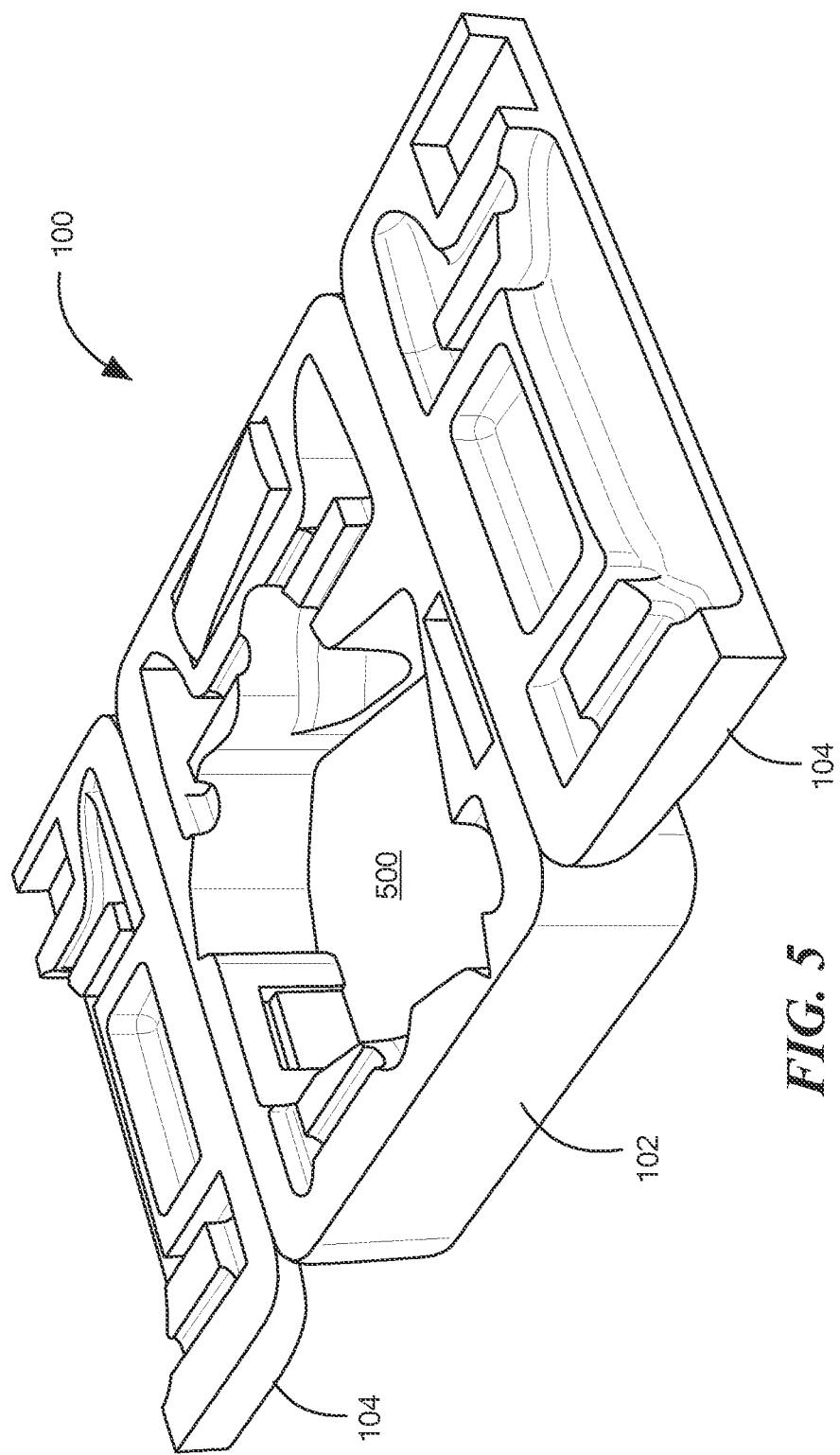
FIG. 5 shows an example of the UAV case in the opened configuration after the UAV has been vertically launched from within the UAV case.

FIG. 5 shows the UAV Case 100 in the opened configuration, after the UAV 200 has been vertically launched from within the UAV Case 100. FIG. 5 shows a Cavity 500 within the UAV Case 100. The Cavity 500 houses the UAV 200, while the UAV 200 is in the storage configuration and the foldable wings of UAV 200 are accordingly in the folded configuration, e.g. when the UAV Case 100 is in the closed configuration while the Set of Doors 104 is closed relative to the Main Member 102, such that the Main Member 102 and the Set of Doors 104 define an enclosed cavity including or consisting of Cavity 500.

Figure 6:
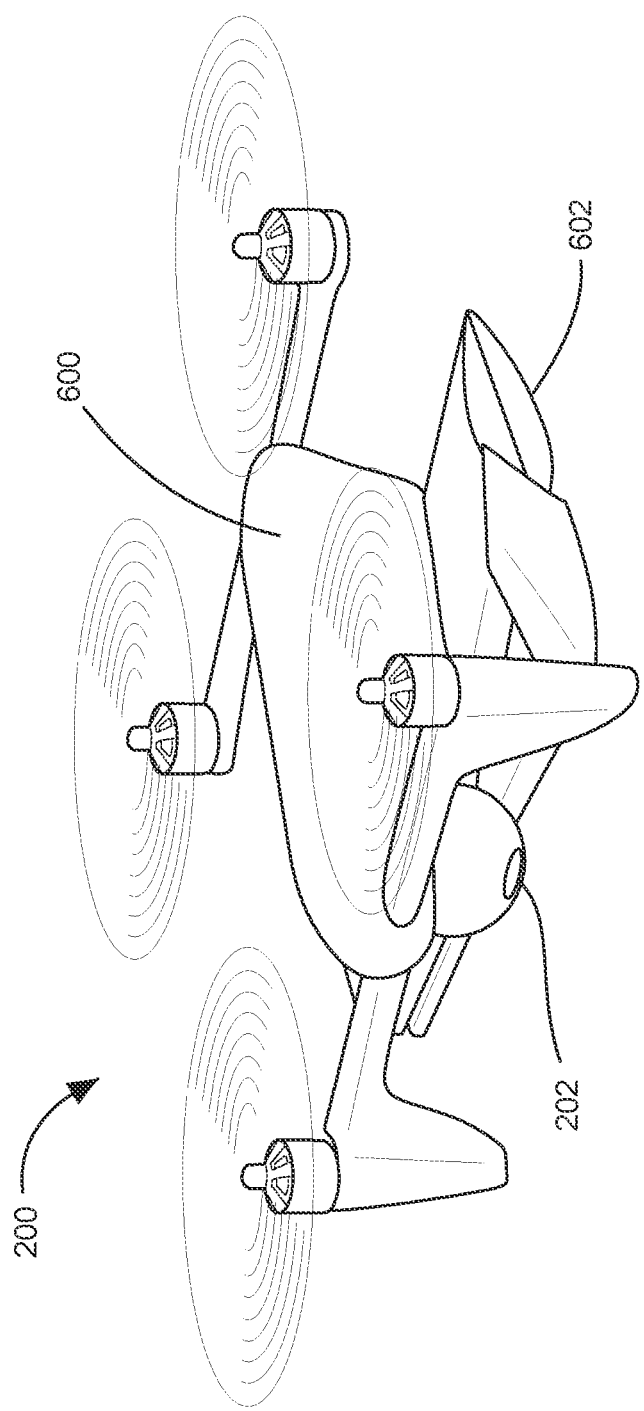
FIG. 6 shows an example of the UAV after vertical launch with the foldable wings in a folded configuration under the body of the UAV.

FIG. 6 shows the UAV 200 in the vertical flight configuration after vertical launch of the UAV 200 from within the UAV Case 100, with the Foldable Wings 602 in the folded configuration, and showing the Foldable Wings 602 located under the UAV Body 600.

Figure 7:
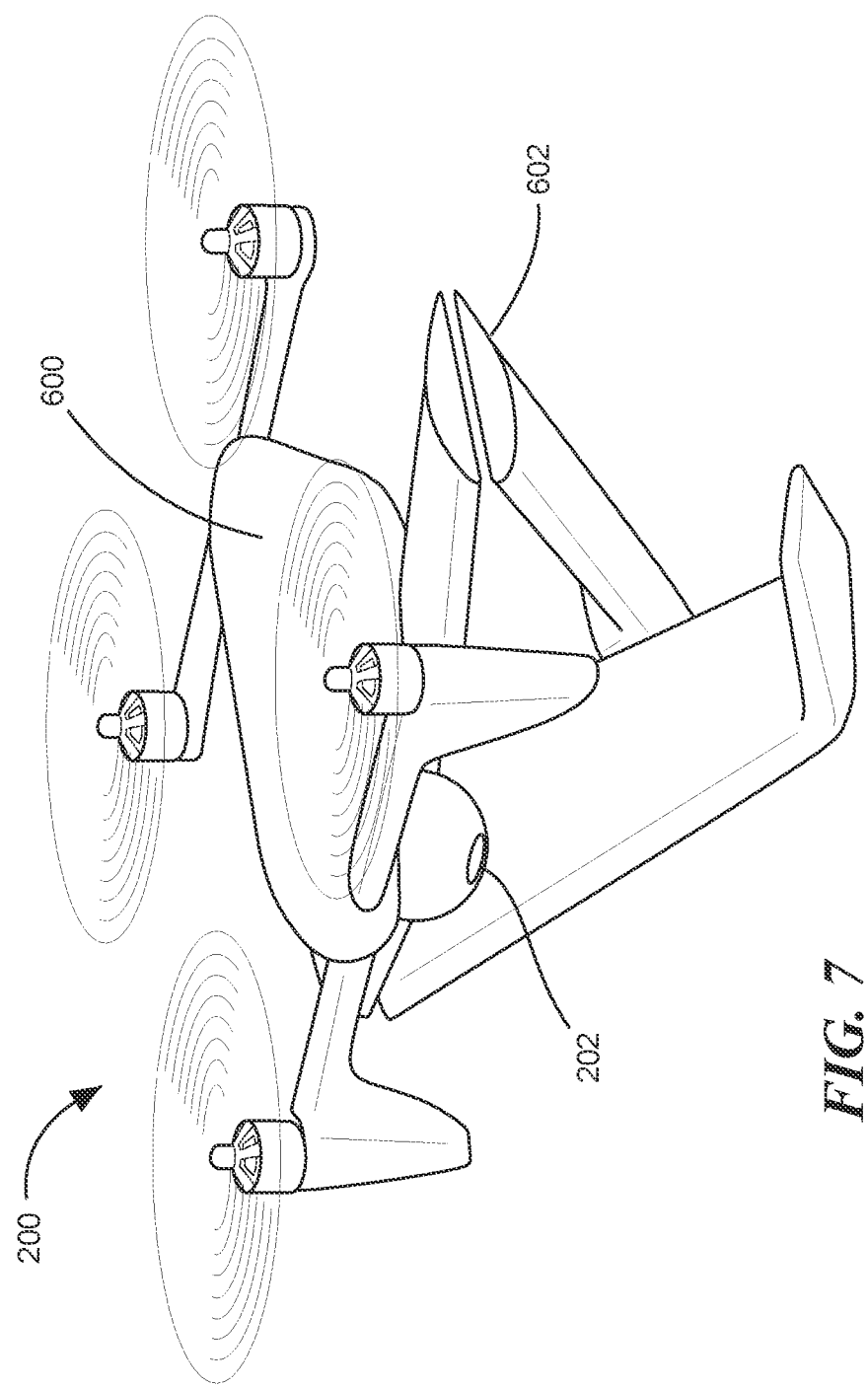
FIG. 7 is a first figure showing an example of the UAV after vertical launch with the foldable wings unfolding.

FIG. 7 shows the UAV 200 airborne after vertical launch from within the UAV Case 100, and with the Foldable Wings 602 automatically unfolding outwards from the UAV Body 600, while the UAV 200 is in the vertical flight configuration.

Figure 8:
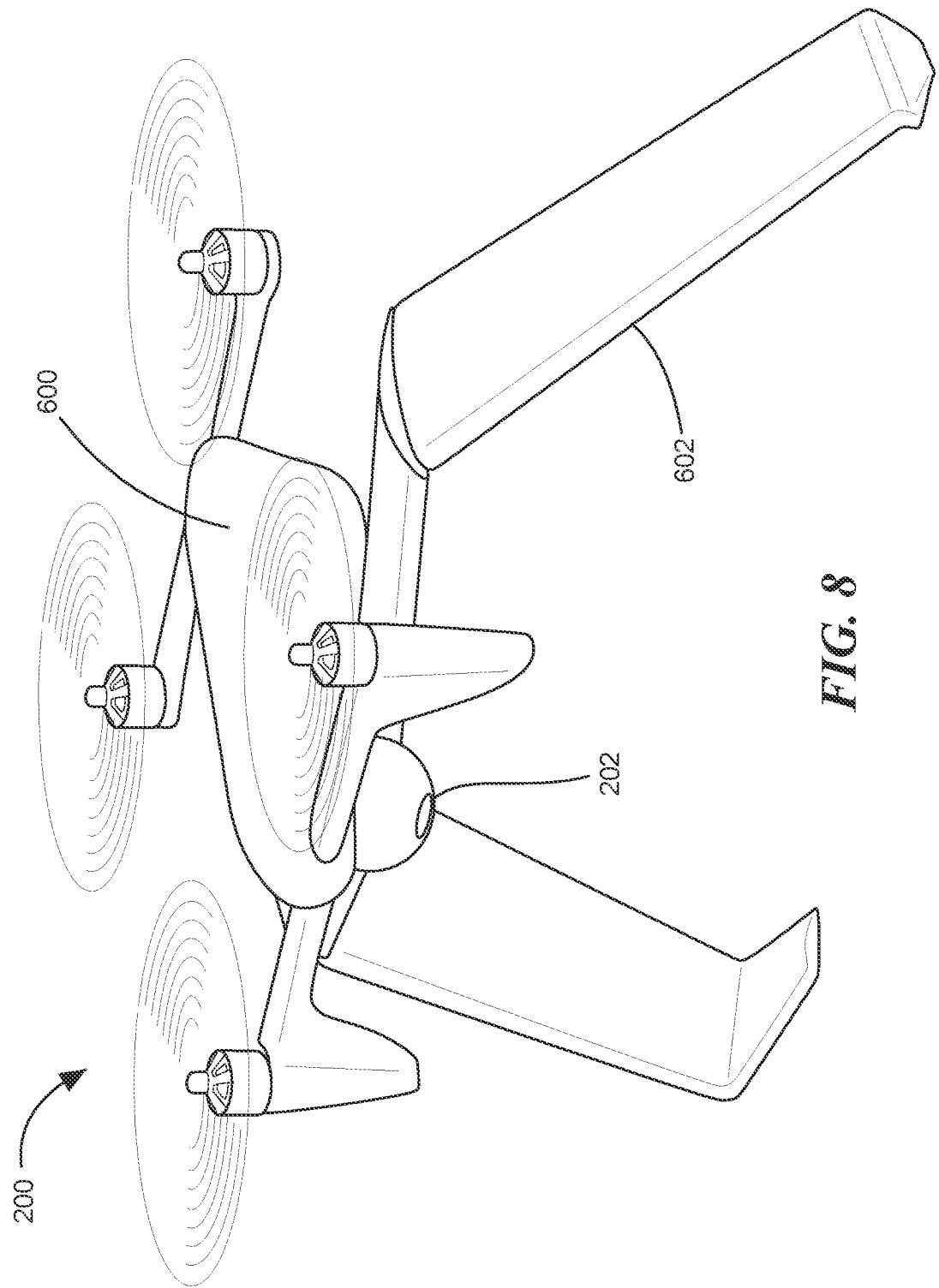
FIG. 8 is a second figure showing an example of the UAV after vertical launch with the foldable wings continuing to unfold.

FIG. 8 is a second figure showing the UAV 200 airborne after vertical launch from within the UAV Case 100, and with the Foldable Wings 602 continuing to automatically unfold outwards from the Body 600, also while the UAV 200 is in the vertical flight configuration.

Figure 9:
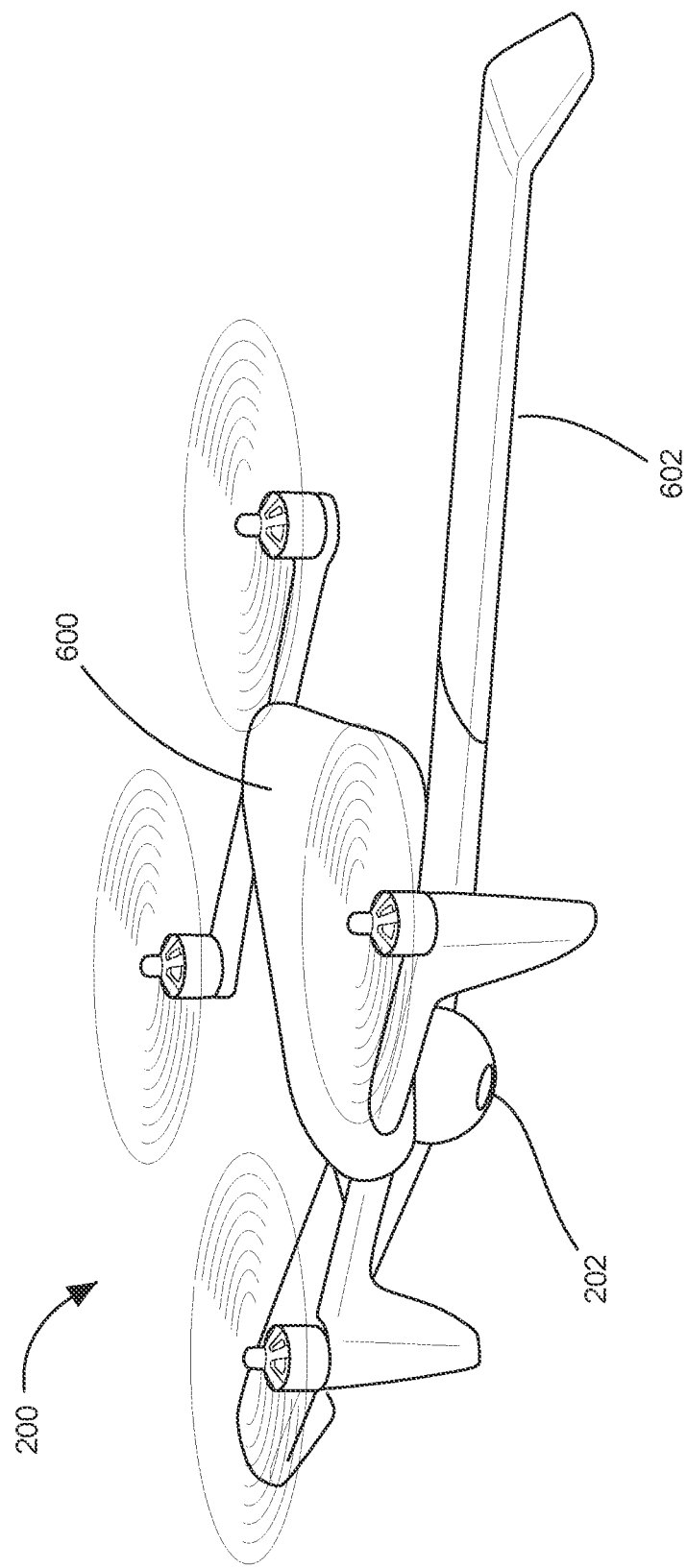
FIG. 9 shows an example of the UAV with the foldable wings extended in preparation for fixed wing horizontal flight.

FIG. 9 shows the UAV 200 with the Foldable Wings 602 having been automatically unfolded outwards from the Body 600 to form a fixed wing in preparation for horizontal flight, also while the UAV 200 is in the vertical flight configuration. After the Foldable Wings 602 have been automatically unfolded to form the fixed wing shown in FIG. 9, the fixed wing has a length that extends beyond any of the dimensions of the UAV Case 100, e.g. the fixed wing has a length that is greater than the length and/or width of the UAV Case 100. See for example the examples of dimensions given in FIGS. 16-18.

Figure 10:
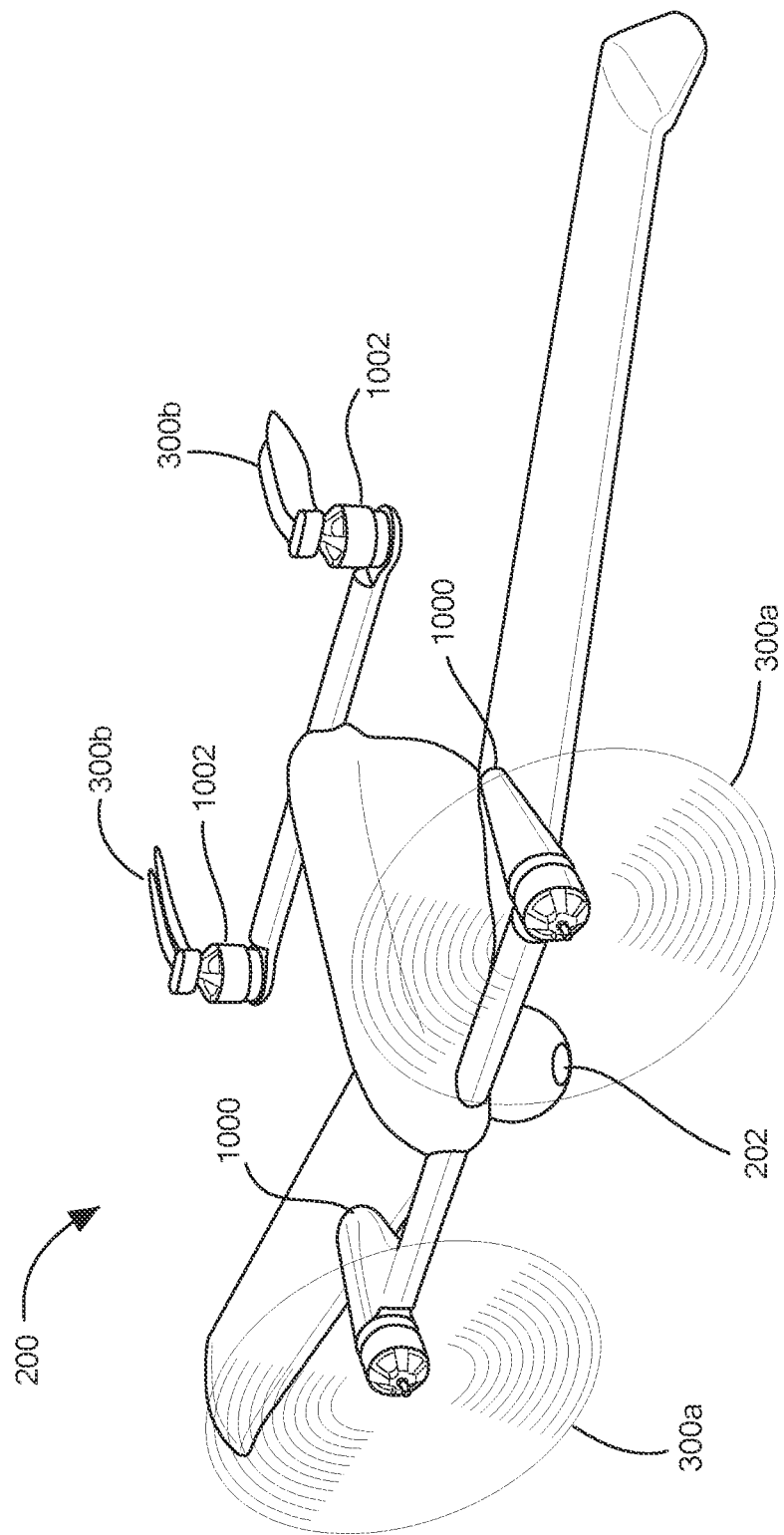
FIG. 10 shows an example of the UAV with propellers and associated motors fully transitioned for fixed wing horizontal flight.

As shown in FIG. 10, the fixed wing formed by the unfolding of the Foldable Wings 602 while UAV 200 is airborne is subsequently used for fixed wing horizontal flight of the UAV 200 after the UAV 200 has transitioned to a horizontal flight configuration. The Set of Propellers 300 may include Front Propellers 300a and Rear Propellers 300b. When the UAV 200 transitions from the vertical flight configuration to the horizontal flight configuration, the Motors 1000 for Front Propellers 300a are rotated from a vertical orientation that is used during vertical flight to a horizontal orientation that is used during horizontal flight. Such rotation of the Motors 1000 for Front Propellers 300a causes Front Propellers 300a to obtain an orientation in which they are rotate vertically while the UAV 200 is in the horizontal flight configuration, as shown in FIG. 10. Also during the time that the UAV 200 transitions from vertical flight configuration to horizontal flight configuration, Motors 1002 for Rear Propellers 300b may rotate somewhat forward (not shown in FIG. 10), in order for Rear Propellers 300b to help change the flight trajectory of UAV 200 to a horizontal direction. Next, Motors 1002 for Rear Propellers 300b are turned off, causing Rear Propellers 300b to stop rotating. Further while UAV 200 is in the horizontal flight configuration, the Rear Propellers 300b may be folded to point rearwards of UAV 200, so that when the UAV 200 is in the horizontal flight configuration the Rear Propellers 300b are stationary and folded rearwards as shown in FIG. 10.

Figure 11:
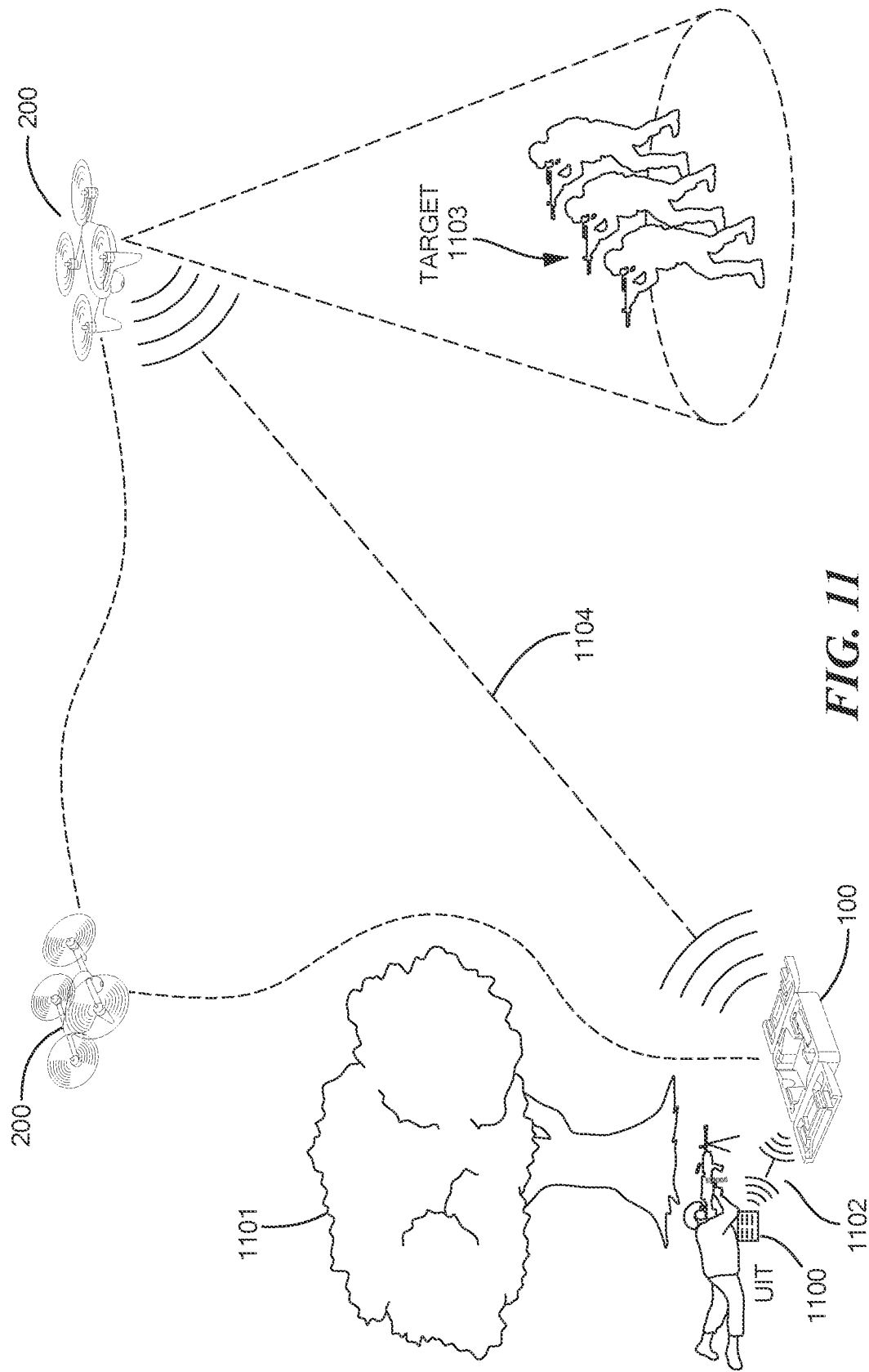
FIG. 11 shows an example in which a UIT (User Interface Terminal) has issued a launch command to the UAV case, causing the UAV case to automatically transition from the closed configuration to the open configuration, and causing the UAV to be automatically launched vertically from within the UAV case, and then travel horizontally to a position above a target, and then securely convey information about the target to the UAV case, which then securely forwards the information received from the UAV to the UIT.

FIG. 11 shows an example in which a soldier or other user enters a launch command to the UIT (User Interface Terminal) 1100 in order to cause the UAV 100 to automatically open and the UAV 200 to be automatically launched. The UIT 1100 may, for example, consist of or include a hand held electronic device, such as a hand held computer, smartphone, tablet computer, etc., having a thin client application or the like executing thereon, that is operable to receive user commands from a user through a user interface to a graphical user interface, such as a touch screen or the like, and to display information received by the UIT 1100 from the UAV Case 100. Such information received by UIT 1100 from UAV Case 100 and displayed by UIT 1100 may include video information received by the UAV Case 100 from the UAV 200, and then forwarded by the UAV Case 100 to the UIT 1100. Information received by UIT 1100 from UAV Case 100 may also or alternatively include one or more alert messages received from the UAV Case 100, such as alert messages received by the UAV 100 from the UAV 200 and then forwarded by the UAV Case 100 to the UIT 1100, causing the UIT 1100 to visually display one or more alert notifications in the graphical user interface of UIT 1100.

The UIT 1100 communicates with the UAV Case 100 in a secure manner, e.g. using encrypted communications over a wireless Secure Communication Channel 1102 that is established between the UAV Case 100 and the UIT 110. The UAV Case 100 is constructed and arranged to provide such secure communications with the UIT 1100, e.g. by way of appropriate transceiver circuitry within the UAV Case 100 that supports encrypted communications between the UAV Case 100 and the UIT 1100.

For example, the user may press on a graphical button or the like in the user interface of the UIT 1100 to cause the UIT 1100 to send a launch command to the UAV Case 100 over the Secure Communication Channel 1102. Upon receipt of the launch command, the UAV Case 100 automatically transitions from the closed configuration to the opened configuration, and sends one or more commands to the UAV 200 that cause the UAV 200 to automatically transition from the storage configuration to the vertical flight configuration, and vertically launch from within the UAV Case 100.

In the example shown in FIG. 11, UAV 200 further includes collision avoidance circuitry that enables UAV 200 to ascend vertically after being launched from within the UAV Case 100 such that UAV 200 detects and avoids obstacles in its vertical flight path, such as the Tree 1101 and/or other obstacles that may be above the UAV Case 100 when the UAV 200 is vertically launched.

After UAV 200 has ascended vertically above the UAV Case 100 to a predetermined altitude, the UAV 200 unfolds its folded wings to form a fixed wing for horizontal flight, transitions from the vertical flight configuration to the horizontal flight configuration, and then flies horizontally until it is located above a predetermined Target 1103 (e.g. enemy troops, etc.), based on a preconfigured flight plan that is entered or selected by the user of the UIT 1100, and that may be provided with the launch command and received by the UAV Case 100 from the UIT 1100, and then conveyed by the UAV Case 100 to the UAV 200, e.g. prior to launching of the UAV 200.

After the UAV 200 is aerially positioned over the Target 1103, the UAV 200 may transition back to the vertical flight configuration, and begin gathering information regarding Target 1103. For example, the UAV 200 may begin capturing video information regarding Target 1103 using Gimbel Camera 202. The UAV 200 then conveys the information captured regarding the Target 1103 over a Secure Communication Channel 1104 that supports communications between the UAV 200 and the UAV Case 100. The UAV 200 communicates with the UAV Case 100 in a secure manner, e.g. using encrypted communications over a wireless Secure Communication Channel 1104 that is established between the UAV Case 100 and the UAV 200. The UAV Case 100 is constructed and arranged to provide such secure communications with the UAV 200, e.g. by way of appropriate transceiver circuitry in the UAV Case 100 that supports encrypted communications between the UAV Case 100 and the UAV 200. The UAV 200 may communicate information such as the encrypted video captured of the Target 1103 and/or one or more alert messages to the UAV Case 100 over the Secure Communication Channel 1104. Upon receipt of the video information from the UAV 200, the UAV Case 100 forwards the video information to the UIT 1100 over Secure Communication Channel 1102 for display to the user within the user interface of the UIT 1100. Similarly, upon receipt of an alert message from the UAV 200, the UAV Case 100 forwards the alert message to UIT 1100 over Secure Communication Channel 1102 to cause an alert to be visually displayed to the user within the user interface of the UIT 1100. For example, in an example in which UAV 200 is constructed and arranged to include acoustic gunfire detection circuitry, and through operation of such circuitry the UAV 200 detects gunfire while aerially positioned over Target 1103, UAV 200 may transmit an alert message indicating the detection of gunfire to UAV Case 100 over Secure Communication Channel 1104, and UAV Case 100 then forwards the alert message to UIT 1100 over Secure Communication Channel 1102 to cause UIT 1100 to display an alert in the user interface of UIT 1100 indicating the detection of gunfire, thus bringing the detected gunfire to the attention of the user of UIT 1100.

Figure 12:
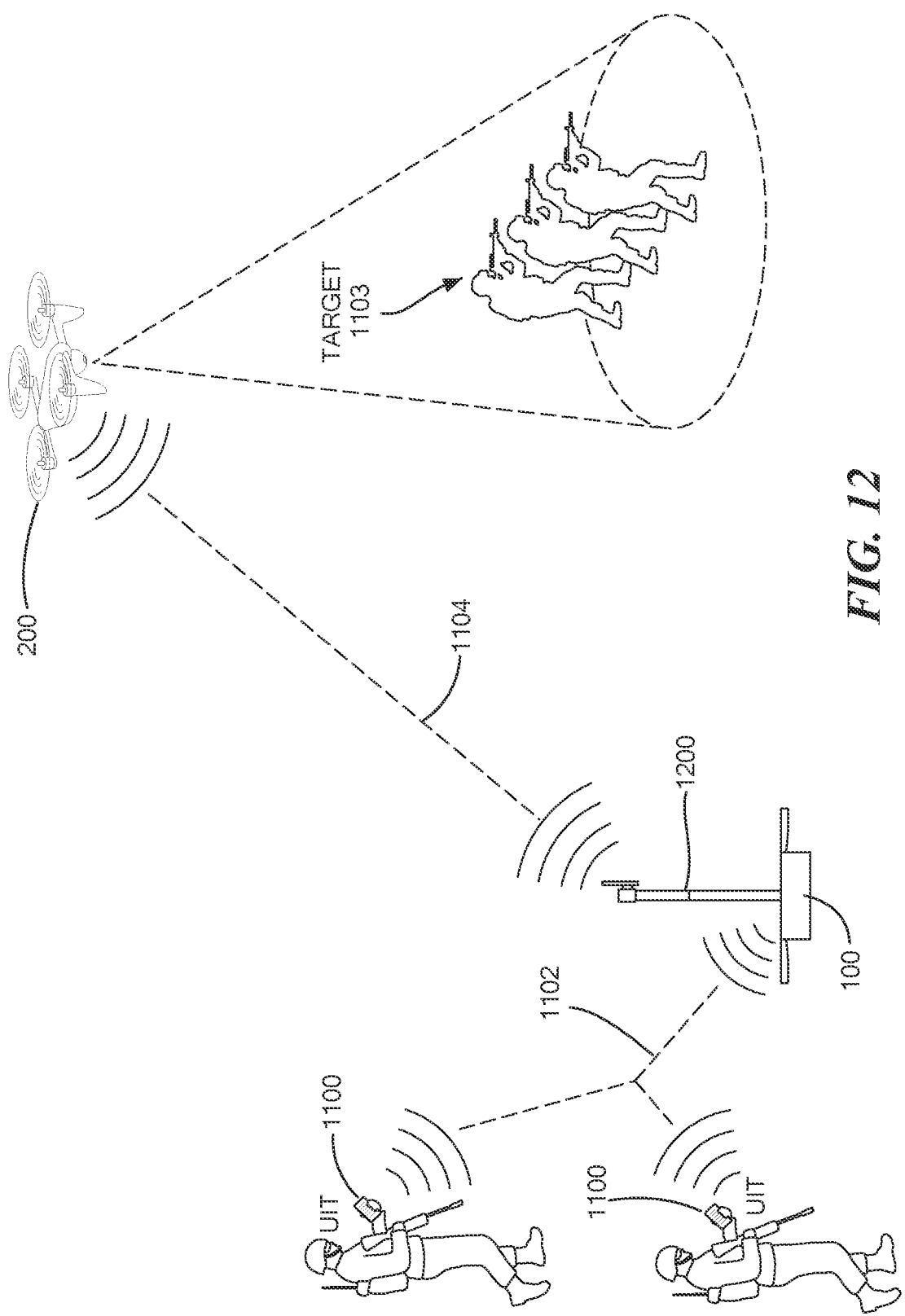
FIG. 12 shows an example in which the UAV case has its communication range extended via a high gain antenna that is connected to the UAV case.

FIG. 12 shows an example in which the UAV Case 100 has its communication range extended via a High Gain Antenna 1200 that is physically connected to the UAV Case 100, e.g. through External Communication and Power Interfaces 105.

As also shown in FIG. 12, Secure Communication Channel 1102 may provide secure communications between the UAV Case 100 and multiple (e.g. 2 or more) UITs 1100. In this way, control of the UAV 200 may be shared across multiple users, and/or information regarding the Target 1103 (e.g. video information) and/or alerts received by the UAV Case 100 from the UAV 200 may be shared by UAV Case 100 to multiple UITs, and accordingly to multiple users.

Figure 13:
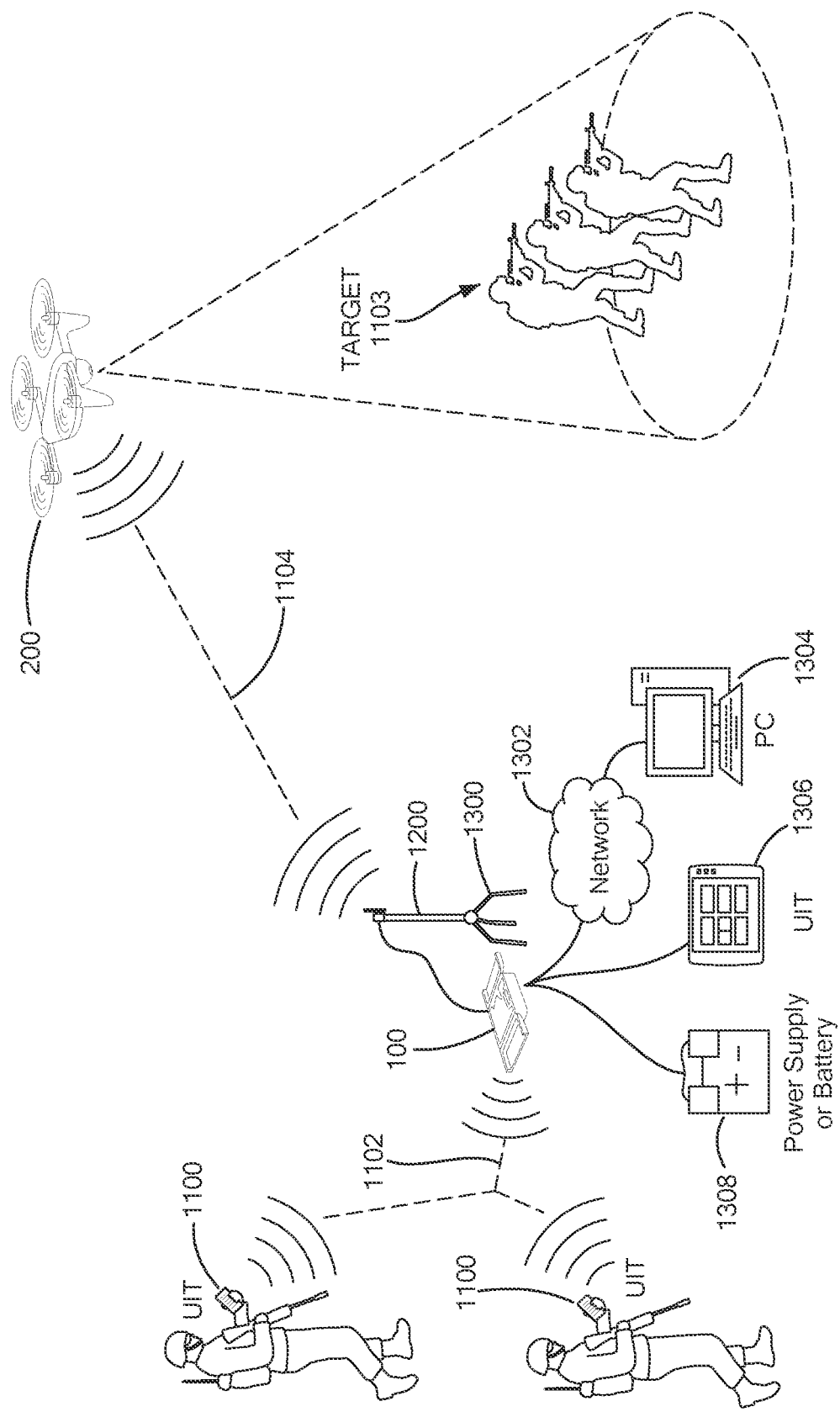
FIG. 13 shows an example of further communication hub capabilities of the UAV case.

FIG. 13 shows an example of communication hub capabilities that may be provided by the UAV Case 100. As shown in FIG. 13, the UAV Case may, for example by way of External Communication and Power Interfaces 105, be physically connected to a Network 1302 (e.g. one or more secure computer and/or communication networks), a Wired UIT 1306, and/or an external Power Supply or Battery 1308. For example, video information and/or alert messages received by UAV Case 100 from UAV 200 over Secure Communication Channel 1104 may also be forwarded over Network 1302 to one or more computers, such as a Personal Computer 1304, and/or to one or more wired UITs, such as Wired UIT 1306. UAV Case 100 and/or UAV 200 may be recharged via the external Power Supply or Battery 1308. If desired, UAV Case 100 and UAV 200 may each be constructed and arranged to use the same type of rechargeable batteries, which may each be recharged via Power Supply or Battery 1308.

FIG. 13 also shows how High Gain Antenna 1200 may in some cases be mounted on a portable Tripod 1300.

Figure 14:
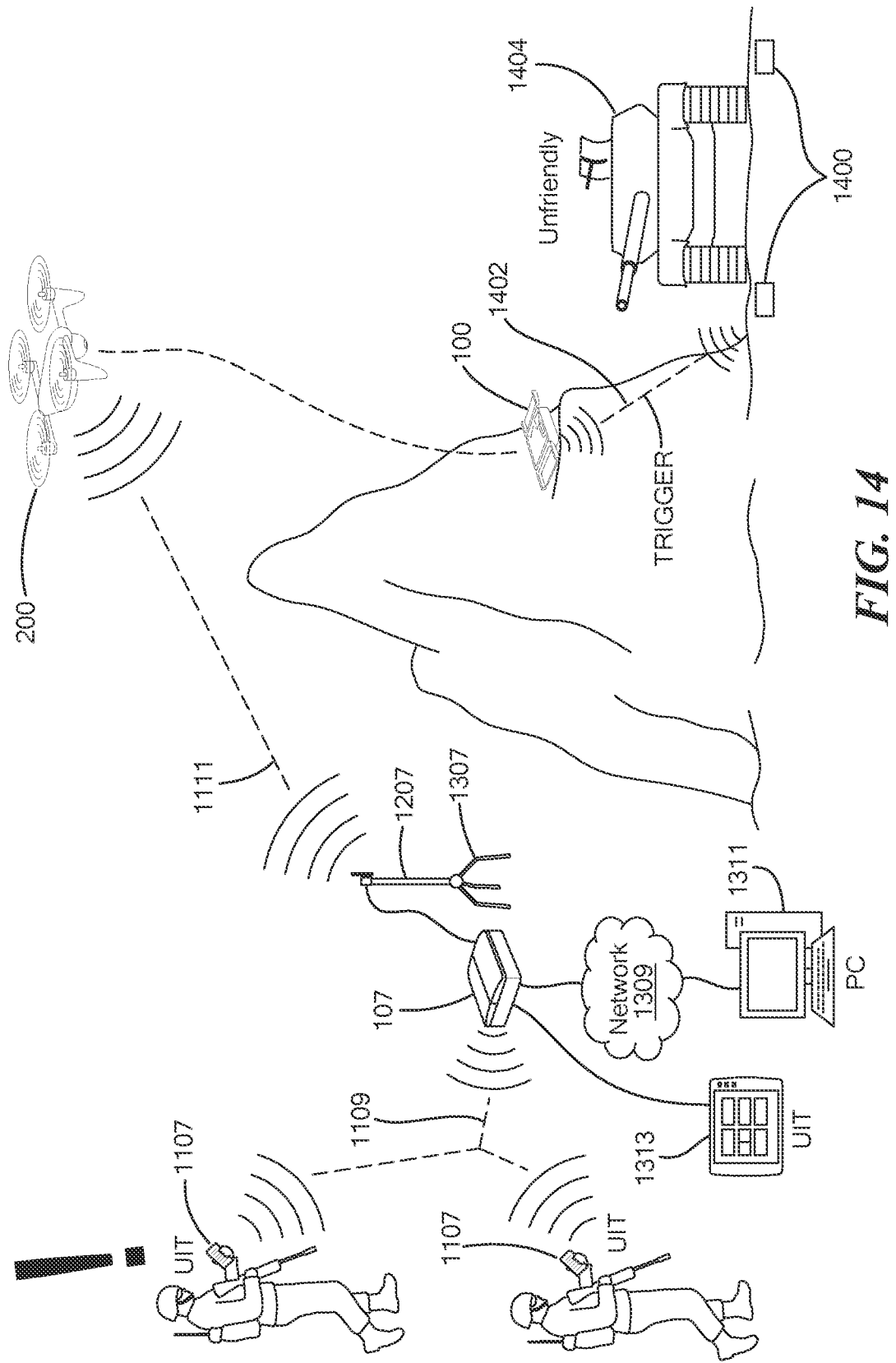
FIG. 14 shows an example in which additional sensing capabilities are provided via one or more external ground sensors.

FIG. 14 shows an example in which additional sensing capabilities may be provided for the UAV Case 100 via one or more external sensors. For example, one or more external ground sensors, shown by External Ground Sensors 1400, may communicate with UAV Case 100, e.g. through an encrypted Wireless Communication Channel 1402 between External Ground Sensors 1400 and UAV Case 100, and/or through one or more physical communication connections between External Ground Sensors 1400 and External Communication and Power Interfaces 105. For example, the External Ground Sensors 1400 may include or consist of one or more of the following: seismic sensors, visual and infrared (IR) cameras, laser tripwires, speech or other types of acoustic signal detectors, passive infrared sensors, inductive vehicle sensors, radio signal detectors, and/or other types of sensors. In response to one or more of the External Ground Sensors 1400 being triggered, e.g. in response to a seismic sensor detecting a sufficient level of ground motion that nearby movement of a vehicle and/or troops is likely, the External Ground Sensors 1400 automatically send a launch command to UAV Case 100. The launch command from External Ground Sensors 1400 causes UAV Case 100 to automatically transition from the closed configuration to the opened configuration and automatically launch the UAV 200. Upon launch, the UAV 200 issues (e.g. transmits) an alert message to alert one or more users that it has been launched. For example, upon being launched, the UAV 200 may transmit an alert message over a Secure Communication Channel 1111 established between UAV 200 and another UAV Case 107, the alert message indicating that UAV 200 has been automatically launched in response to one or more of the External Ground Sensors 1400 being triggered. The other UAV Case 107 receives the alert message from UAV 200, e.g. through a High Gain Antenna 1207 mounted on a Tripod 1307, and then forwards the alert message to one or more UITs 1107, Wired UIT 1313, and/or over a Network 1309 to one or more Personal Computers 1311. Receipt of the alert message forwarded by UAV Case 100 causes an alert to be displayed on one or more of the UITs 1107, Wired UIT 1313, and/or Personal Computer 1311, visually indicating to one or more users of one or more of the UITs 1107, Wired UIT 1313, and/or Personal Computer 1311 that the UAV 200 has been automatically launched in response to one or more of External Ground Sensors 1400 being triggered. UAV 200 then transmits information captured regarding the area over which UAV 200 was launched (e.g. video information captured by the Gimbel Camera 102, etc.) to UAV Case 107 for UAV Case 107 to forward to one or more of the UITs 1107, Wired UIT 1313, and/or Personal Computer 1311, for display by one or more of UITs 1107, Wired UIT 1313, and/or Personal Computer 1311.

Figure 15:
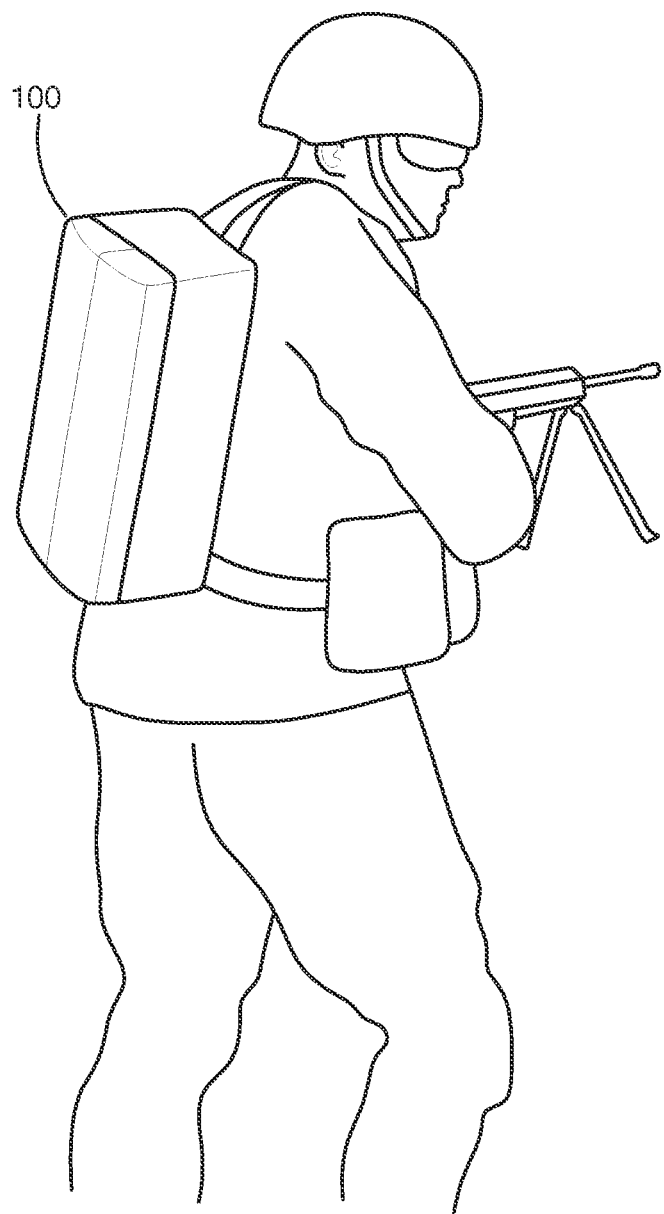
FIG. 15 shows an example of the UAV case in a backpack-sized form factor.

FIG. 15 shows an example of the UAV Case 100 in a backpack-sized form factor. When UAV Case 100 is constructed and arranged in a backpack-sized form factor, a user such as a soldier may conveniently transport the UAV Case 100 with the UAV 200 safely contained in the UAV Case 100, e.g. to a desired launch location as needed for a specific operational situation.

Figure 16:
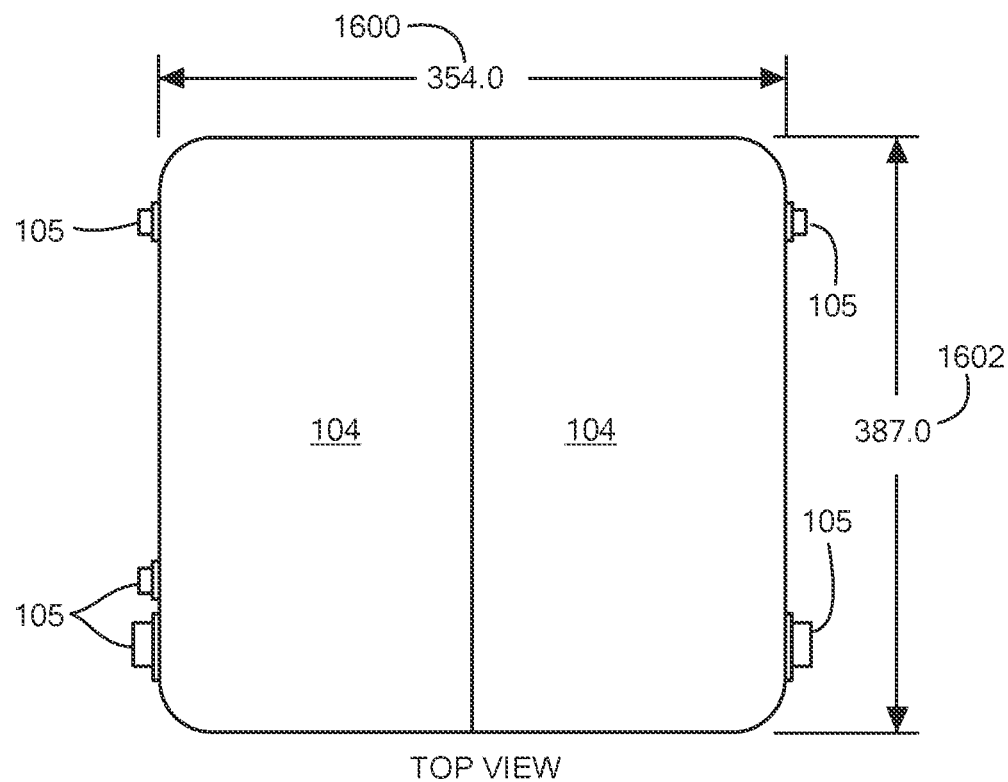
FIG. 16 shows a top view of an example of the UAV case in the closed configuration with examples of relevant dimensions.

FIG. 16 shows a top view of an example of the disclosed UAV Case 100 in the closed configuration, with examples of specific width and length dimensions. In the example of FIG. 16, the UAV Case 100 is constructed and arranged to have a Width 1600 of 354 millimeters, and a Length 1602 of 387 millimeters. Those skilled in the art will recognize that the disclosed UAV Case 100 is not limited to the specific width and length dimensions shown in FIG. 16, and that the disclosed UAV Case 100 may alternatively be constructed and arranged to have other specific width and length dimensions.

Figure 17:
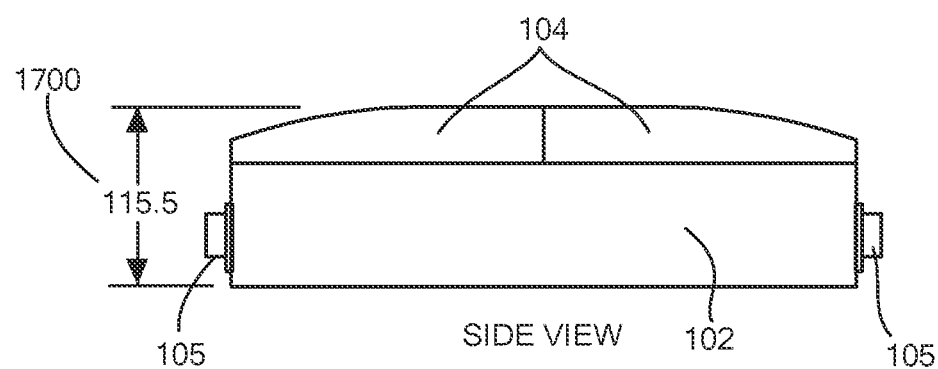
FIG. 17 shows a side view of an example of the UAV case in the closed configuration with examples of relevant dimensions.

FIG. 17 shows a side view of an example of the disclosed UAV Case 100 in the closed configuration, with an example of a specific height. In the example of FIG. 17, the UAV Case is constructed and arranged to have a Height 1700 of 115.5 millimeters. Those skilled in the art will recognize that the disclosed UAV Case 100 is not limited to the specific height shown in FIG. 16, and that the disclosed UAV Case 100 may alternatively be constructed and arranged to have another specific height.

Figure 18:
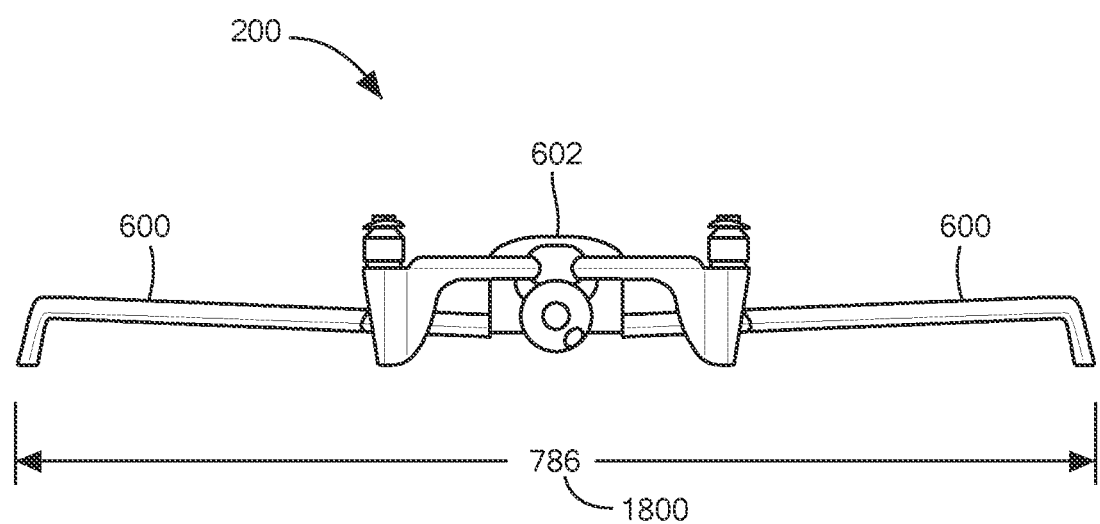
FIG. 18 shows a front view of an example of the UAV with an example of the length of the foldable wings when they are extended outwards for horizontal flight.

FIG. 18 shows a front view of an example of the disclosed UAV 200 having its Foldable Wings 602 unfolded outwards from the UAV Body 600 to form a fixed wing for fixed wing horizontal flight, where the fixed wing has a Length 1800 that extends beyond (i.e. exceeds) the length and width dimensions of the UAV Case 100. As shown in the example of FIG. 18, the fixed wing resulting from Foldable Wings 602 being unfolded outwards from UAV Body 600 has a Length 1800 of 786 millimeters. Accordingly, in an example where UAV Case 100 has a width of 354 millimeters, a length of 387 millimeters, and a height of 115.5 millimeters, the Length 1800 of 786 millimeters exceeds any of the dimensions of the UAV Case 100. Those skilled in the art will recognize that the disclosed UAV 200 is not limited to having a fixed wing with a Length 1800 of 786 millimeters, and that the disclosed UAV 200 may alternatively be constructed and arranged to have a fixed wing resulting from the unfolding of Foldable Wings 602 with another specific Length 1800 that exceeds the dimensions of the UAV Case 100.

Figure 19:
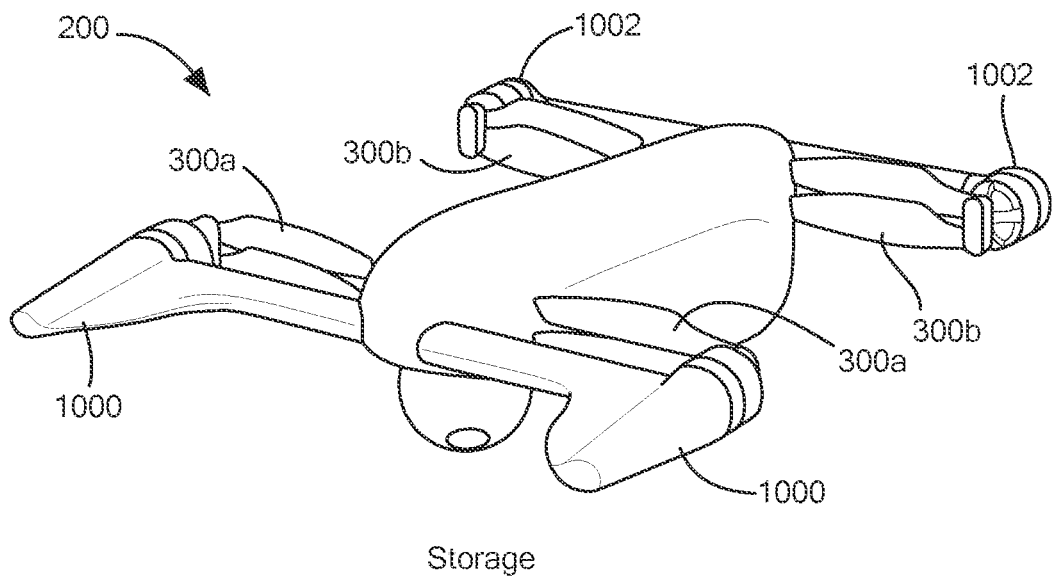
FIG. 19 shows an example of the UAV in a storage configuration suitable for carrying within the UAV case.

FIG. 19 shows an example of the UAV 200 in the storage configuration, e.g. while being transported within the UAV Case 100. For purposes of clarity, the wings of UAV 200 are omitted from the depiction of UAV 200 in FIG. 19. As shown in FIG. 19, when the UAV 200 is in the storage configuration, Motors 1000 for Front Propellers 300a and Motors 1002 for Rear Propellers 300b are all horizontally oriented. For example, in the storage configuration of UAV 200 as shown in FIG. 19, Motors 1000 may be in a horizontal orientation in which Motors 1000 point the Front Propellers 300a towards the rear of UAV 200. Also for example, in the storage configuration of UAV 200 as shown in FIG. 19, Motors 1002 may be in a horizontal orientation in which Motors 1002 point the Rear Propellers 300b towards the front of UAV 200. Both Motors 1000 and Motors 1002 are off when the UAV 200 is in the storage configuration, and Front Propellers 300a and Rear Propellers 300b are accordingly stationary. Further, as also shown in FIG. 19, when UAV 200 is in the storage configuration, Front Propellers 300a and Rear Propellers 300b may be folded inwards to point towards the body of UAV 200.

Figure 20:
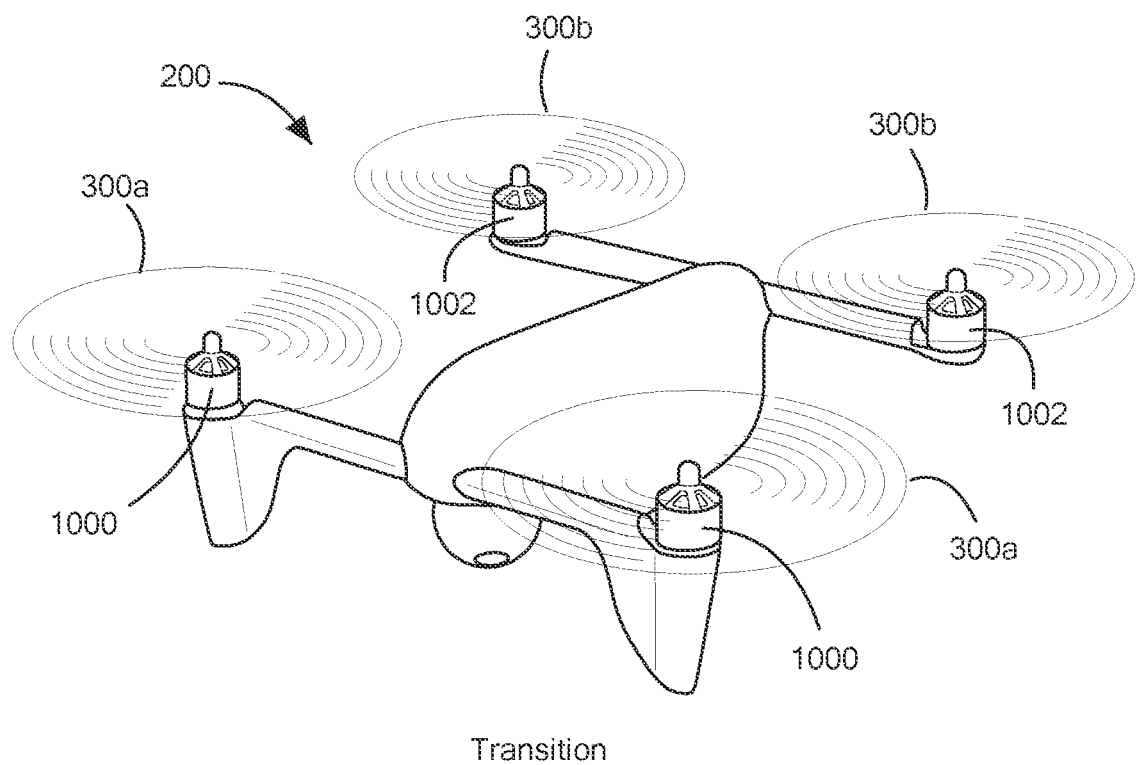
FIG. 20 shows an example of the UAV in a vertical flight configuration suitable for launching from within the UAV case.

FIG. 20 shows an example of the UAV 200 in the vertical flight configuration. For purposes of clarity, the wings of UAV 200 are also omitted from the depiction of UAV 200 in FIG. 20. As shown in FIG. 20, when the UAV 200 is in vertical flight, Motors 1000 for Front Propellers 300a and Motors 1002 for Rear Propellers 300b are all vertically oriented. For example, in the vertical flight configuration of UAV 200 shown in FIG. 20, Motors 1000 may be in a vertical orientation in which Motors 1000 point the Front Propellers 300a above UAV 200. Also for example, in the vertical configuration of UAV 200 shown in FIG. 20, Motors 1002 may be in a vertical orientation in which Motors 1002 point the Rear Propellers 300b above the UAV 200. Both Motors 1000 and Motors 1002 are turned on when the UAV 200 is in the vertical flight configuration, causing Front Propellers 300a and Rear Propellers 300b to rotate horizontally when the UAV 200 is in the vertical flight configuration. Accordingly, when the UAV 200 transitions from the storage configuration of FIG. 19 to the vertical flight configuration of FIG. 20, the Motors 1000 and Motors 1002 are pivoted from the horizontal orientations shown in FIG. 19 to the vertical orientations shown in FIG. 20, and then the Motors 1000 and Motors 1002 are turned on.

Figure 21:
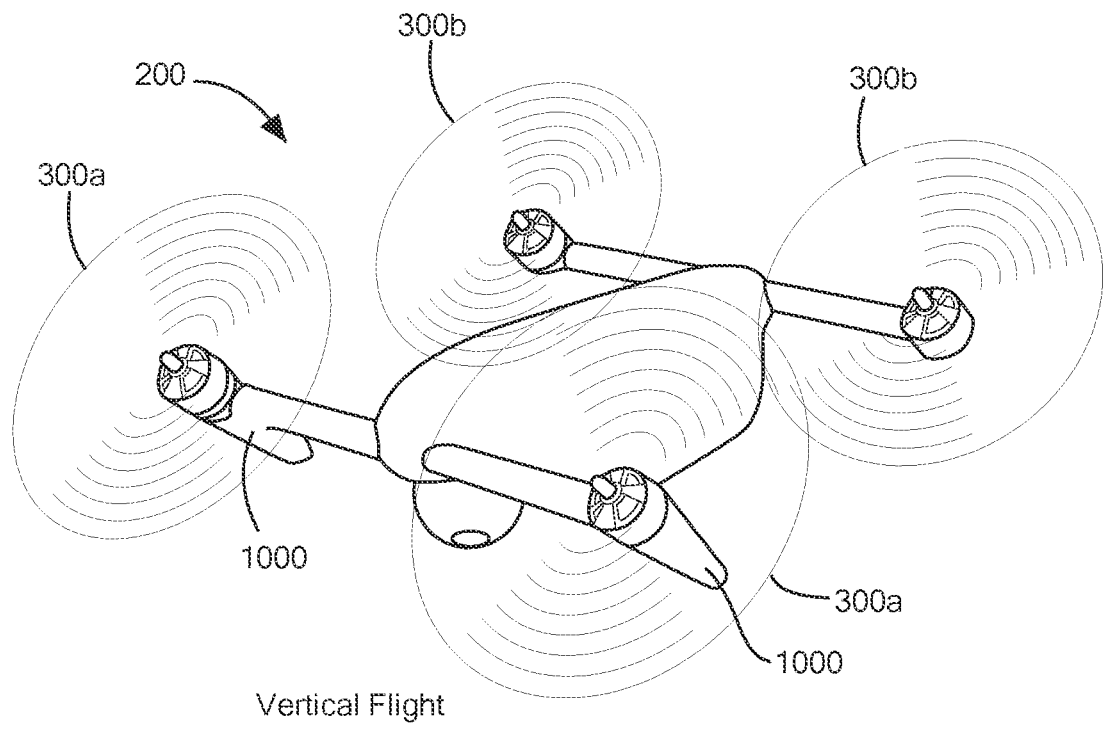
FIG. 21 shows an example of the UAV transitioning from the vertical flight configuration to a horizontal flight configuration.
Figure 22:
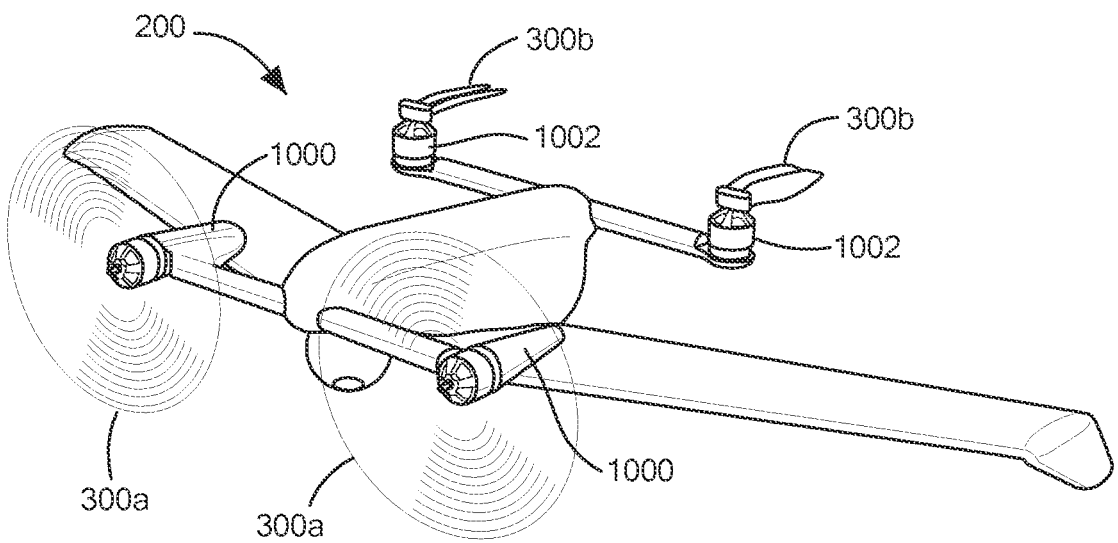
FIG. 22 shows an example of the UAV in the horizontal flight configuration.

FIG. 21 shows an example of the UAV 200 transitioning from the vertical flight configuration to the horizontal flight configuration for fixed wing horizontal flight. For purposes of clarity, the wings of UAV 200 are also omitted from the depiction of UAV 200 in FIG. 21. As shown in FIG. 21, when the UAV 200 transitions from vertical flight to fixed wing horizontal flight, the Motors 1000 are pivoted forward from the vertical orientations shown in FIG. 20 such that the Motors 1000 each obtain a horizontal orientation in which Motors 1000 point the Front Propellers 300a towards the front of the UAV 200, in order to rotate the Front Propellers 300a vertically and move the UAV 200 horizontally as it flies through the air during fixed wing horizontal flight. As also shown in FIG. 21, Motors 1002 may also pivot slightly forward from the vertical orientations shown in FIG. 20, in order to assist in changing the UAV 200 from vertical flight to fixed wing horizontal flight. However, unlike the Motors 1000, the Motors 1002 are not completely pivoted to a fully horizontal orientation during the transition to the horizontal flight configuration, and are instead at some point returned to their previous vertical orientations for fixed wing horizontal flight, as shown in FIG. 22. The Motors 1000 remain on during the transition of the UAV 200 from the vertical flight configuration to the horizontal flight configuration. The Motors 1002 may be turned off at some point during the transition from the vertical flight configuration to the horizontal flight configuration, such that during fixed wing horizontal flight the UAV 200 is powered only by the Motors 1000.

FIG. 22 shows an example of the UAV 200 in the horizontal flight configuration, having been transitioned from vertical flight to fixed wing horizontal flight. As shown in FIG. 22, in the horizontal flight configuration, the Motors 1000 are horizontally oriented such that the Motors 1000 point the Front Propellers 300a towards the front of the UAV 200, and such that the Front Propellers 300a rotate vertically. Motors 1002 are oriented vertically and turned off when the UAV 200 is in the horizontal flight configuration, and Rear Propellers 300b may be stationary and folded rearwards during fixed wing horizontal flight.

Figure 23:
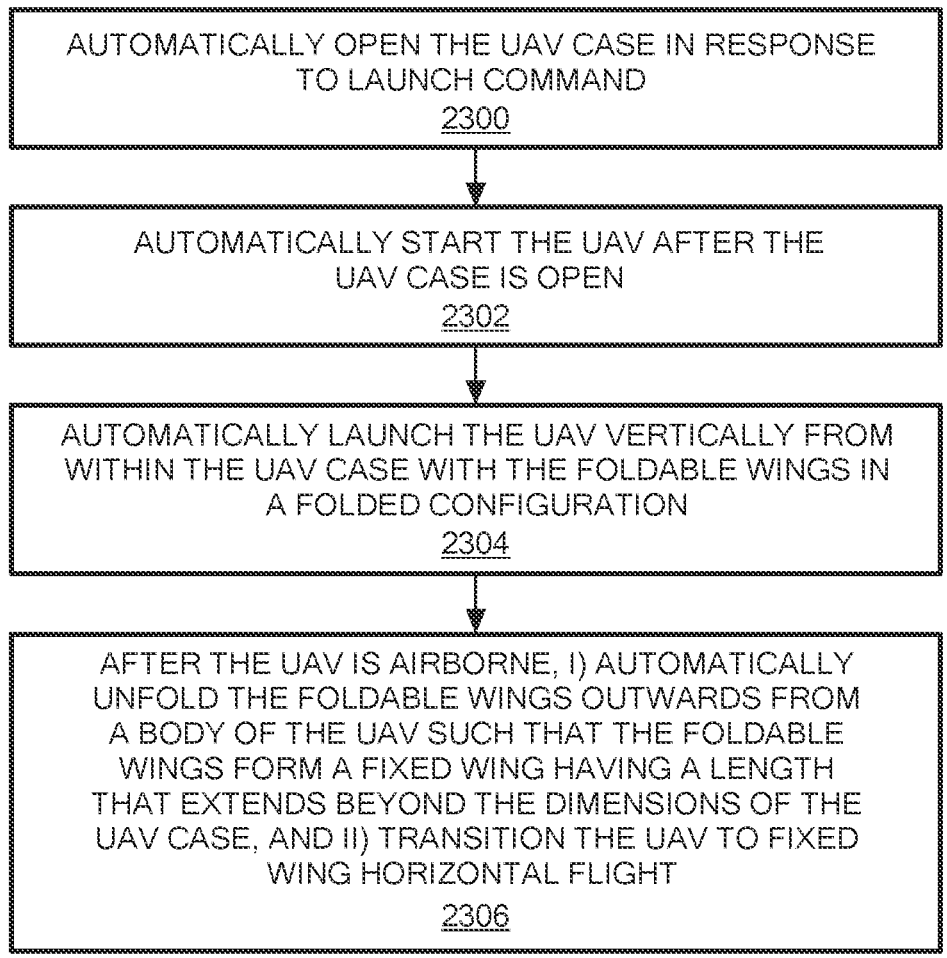
FIG. 23 is a flow chart showing an example of steps that may be performed during operation of the disclosed UAV module.

FIG. 23 is a flow chart illustrating an example of steps that may be performed during operation of the disclosed UAV module. As shown in FIG. 23, in step 2300 the UAV case is automatically opened in response to receipt of a launch command. In step 2302 the UAV is automatically started after the UAV case is opened. In step 2304, the UAV is automatically launched vertically from within the UAV case. The foldable wings of the UAV are in a folded configuration when the UAV is vertically launched from the UAV case. In step 2306, after the UAV is airborne, i) the foldable wings of the UAV are automatically unfolded outwards from the body of the UAV such that the foldable wings form a fixed wing having a length that extends beyond the dimensions of the UAV case, and ii) the UAV transitions to fixed wing horizontal flight.

While the invention is described through the above examples and exemplary embodiments, it will be understood by those of ordinary skill in the art that modification to and variation of the illustrated examples and embodiments may be made without departing from the inventive concepts herein disclosed.

What is claimed is:

1. An unmanned aerial vehicle (UAV) module, comprising:
   a UAV having foldable wings coupled to a body of the UAV;
   a UAV case having length and width dimensions that is constructed and arranged to operate in (i) a closed configuration that stores and protects the UAV while the UAV is transported within the UAV case between locations with the foldable wings in a folded configuration, and (ii) an opened configuration that provides a base from which the UAV launches vertically from within the UAV case while the foldable wings of the UAV remain in the folded configuration; and
   wherein the UAV is constructed and arranged to automatically unfold the foldable wings outwards from the body of the UAV to form a fixed wing having a length that extends beyond the length and width dimensions of the UAV case for fixed wing horizontal flight after the UAV is airborne;
   wherein the UAV case includes a main member and a set of doors that are moveably coupled to the main member;
   wherein the UAV case is further constructed and arranged such that each door in the set of doors is closed relative to the main member when the UAV case is in the closed configuration, and such that the main member and the set of doors define an enclosed cavity that houses the UAV with the foldable wings in the folded configuration; and
   wherein the UAV is further constructed and arranged to automatically transition from the closed configuration to the opened configuration at least in part by automatically opening the set of doors relative the main member to allow the UAV to exit the UAV case as it launches vertically from within the UAV case.

2. The unmanned aerial vehicle module as in claim 1, wherein the UAV case is further constructed and arranged to provide secure communications between the UAV case and both i) the UAV, and ii) at least one user interface terminal (UIT).

3. The unmanned aerial vehicle module as in claim 2, wherein the UAV case is further constructed and arranged to forward information received by the UAV case from the UAV to the at least one UIT.

4. The unmanned aerial vehicle module as in claim 3 wherein the UAV case is further constructed and arranged such that the UAV and the user interface terminal concurrently fit within the UAV case when the UAV case is in the closed configuration.

5. The unmanned aerial vehicle module as in claim 4, wherein the UAV case is further constructed and arranged to automatically transition from the closed configuration to the opened configuration and automatically launch the UAV in response to receipt of a launch command from the user interface terminal.

6. The unmanned aerial vehicle module as in claim 1, wherein the UAV case is communicable with an external ground sensor; and
   wherein the UAV case is further constructed and arranged to automatically transition from the closed configuration to the opened configuration and launch the UAV in response to receipt of a launch command from the external ground sensor.

7. The unmanned aerial vehicle module as in claim 6, wherein the UAV is further constructed and arranged to, upon being launched in response to receipt by the UAV case of the launch command from the external ground sensor, automatically transmit an alert message indicating that the UAV has been automatically launched.

8. The unmanned aerial vehicle module as in claim 1, wherein the UAV is further constructed and arranged such that the foldable wings are folded under the body of the UAV when the foldable wings are in the folded configuration.

9. The unmanned aerial vehicle module as in claim 2 wherein the UAV further includes a set of propellers; and
   wherein the UAV and the UAV case are further constructed and arranged to provide complementary geometries in which, when the UAV case is in the opened configuration, the UAV body fits within the main member of the UAV case and the propellers of the UAV rotate freely with respect to the set of doors and the main member to allow vertical launch of the UAV from within the UAV case.

10. The unmanned aerial vehicle module as in claim 1 wherein the UAV case is further constructed and arranged in a backpack.

11. A method of operating an unmanned aerial vehicle (UAV) module including (i) a UAV having foldable wings, (ii) a UAV case having length and width dimensions, and (iii) at least one user interface terminal, the method comprising:
   automatically opening the UAV case in response to a launch command;
   automatically starting the UAV after the UAV case is open;
   automatically launching the UAV vertically from within the UAV case with the foldable wings in a folded configuration;
   after the UAV is airborne, i) automatically unfolding the foldable wings outwards from a body of the UAV such that the foldable wings form a fixed wing having a length that extends beyond the dimensions of the UAV case, and ii) transitioning the UAV to fixed wing horizontal flight;
   providing a first secure communication channel between the UAV case and the UAV;

providing a second secure communication channel between the UAV case and the at least one user interface terminal (UIT); and receiving the launch command, by the UAV case, from the user interface terminal over the first secure communication channel.

12. The method of claim 11, further comprising forwarding information received by the UAV case from the UAV over the first secure communication channel to the at least one UIT over the second secure communication channel.

13. The method of claim 11, further comprising receiving the launch command, by the UAV case, from an external ground sensor.

14. The method of claim 11, further comprising:

after the UAV is launched in response to receipt by the UAV case of the launch command from the external ground sensor, automatically transmitting an alert message from the UAV indicating that the UAV has been automatically launched.

* * * * *